(12) United States Patent
Wirola et al.

(10) Patent No.: US 10,520,579 B2
(45) Date of Patent: Dec. 31, 2019

(54) COMPRESSING AND DECOMPRESSING DATA ABOUT RADIO SIGNALS

(71) Applicant: HERE GLOBAL B.V., Eindhoven (NL)

(72) Inventors: Lauri Wirola, Tampere (FI); Pavel Ivanov, Tampere (FI); Muhammad Irshan Khan, Tampere (FI); Jari Syrjärinne, Tampere (FI); Jukka Talvitie, Tampere (FI); Elena-Simona Lohan, Tampere (FI)

(73) Assignee: HERE Global, B.V., Eindhoven (NL)

( * ) Notice: Subject to any disclaimer, the term of this patent is extended or adjusted under 35 U.S.C. 154(b) by 0 days.

(21) Appl. No.: 15/572,642

(22) PCT Filed: May 12, 2015

(86) PCT No.: PCT/EP2015/060446
§ 371 (c)(1),
(2) Date: Nov. 8, 2017

(87) PCT Pub. No.: WO2016/180480
PCT Pub. Date: Nov. 17, 2016

(65) Prior Publication Data
US 2018/0136308 A1    May 17, 2018

(51) Int. Cl.
*H04W 24/00*    (2009.01)
*G01S 5/02*    (2010.01)
(Continued)

(52) U.S. Cl.
CPC .......... *G01S 5/0278* (2013.01); *G01S 5/0242* (2013.01); *G01S 5/0247* (2013.01); *G01S 5/0252* (2013.01);
(Continued)

(58) Field of Classification Search
CPC ....... H04W 4/02; H04W 64/00; H04W 16/18; H04W 4/029
See application file for complete search history.

(56) References Cited

U.S. PATENT DOCUMENTS 6,661,924 B1    12/2003    Abe et al.
7,483,585 B2    1/2009    Brakus et al.
(Continued)

FOREIGN PATENT DOCUMENTS

WO    WO-2013/084032 A1    6/2013
WO    WO-2013/110971 A1    8/2013
(Continued)

OTHER PUBLICATIONS

International Preliminary Report on Patentability (Chapter 1) for International patent Application No. PCT/EP2015/060446 dated Nov. 23, 2017, 11 pages.
(Continued)

*Primary Examiner* — Khalid W Shaheed
(74) *Attorney, Agent, or Firm* — Alston & Bird LLP

(57) ABSTRACT

An apparatus obtains a set of radio data comprising signal strength related values for radio signals transmitted by a transmitter with an association of each signal strength related value with a representation of a geographical location (201). The apparatus applies a frequency transform to the obtained set of radio data to obtain transform coefficients, each transform coefficient comprising a transform index and an associated transform value (202). The apparatus selects a subset of transform indices having more significant transform values than the remaining transform indices (203) and compresses the transform indices by encoding each transform index exploiting a probability of occurrence of an index value of a respective transform index (204). The same or another apparatus decodes the com-
(Continued)

pressed transform indices again for use in position operations.

17 Claims, 14 Drawing Sheets

(51) Int. Cl.
    *H04L 29/06*     (2006.01)
    *H04W 28/06*     (2009.01)

(52) U.S. Cl.
    CPC ............ *G01S 5/0284* (2013.01); *H04L 69/04* (2013.01); *H04W 28/06* (2013.01)

(56) References Cited

U.S. PATENT DOCUMENTS

| | | | |
|---|---|---|---|
| 9,234,958 B2 | 1/2016 | Syrjarinne et al. | |
| 9,883,352 B2 | 1/2018 | Wirola et al. | |
| 2007/0031054 A1 | 2/2007 | Shain et al. | |
| 2008/0170613 A1* | 7/2008 | Tian .................... | H04N 19/13 375/240.03 |
| 2013/0051459 A1* | 2/2013 | Kirchhoffer ........... | H04N 19/50 375/240.07 |
| 2013/0053067 A1* | 2/2013 | Aggarwal ............. | H04W 64/00 455/456.2 |
| 2013/0281111 A1 | 10/2013 | Syrjarinne et al. | |
| 2014/0307801 A1* | 10/2014 | Ikai ....................... | H04N 19/91 375/240.18 |
| 2014/0335894 A1 | 11/2014 | Wirola | |
| 2015/0100743 A1 | 4/2015 | Wirola et al. | |
| 2016/0131486 A1* | 5/2016 | Hendrix ............... | G01C 21/206 701/525 |
| 2016/0161592 A1 | 6/2016 | Wirola et al. | |
| 2019/0200318 A1 | 6/2019 | Wirola et al. | |

FOREIGN PATENT DOCUMENTS

| | | |
|---|---|---|
| WO | WO-2013/136123 A1 | 9/2013 |
| WO | WO-2013/136124 A1 | 9/2013 |
| WO | WO-2013/136128 A1 | 9/2013 |
| WO | WO-2014/000090 A1 | 1/2014 |
| WO | WO-2015/022149 A1 | 1/2015 |
| WO | WO-2015/024758 A1 | 2/2015 |

OTHER PUBLICATIONS

"JPEG—Wikipedia, the free encyclopedia." [retrieved Jan. 29, 2016]. Retrieved from the Internet: <URL: https://en.wikipedia.org/wiki/JPEG> (dated Jan. 16, 2016), 21 pages.
Bhattad et al. "Accurate Energy-Efficient Localization using Radio Database Compression and Clustering Technique." International Journal of Engineering and Advanced Technology (IJEAT) ISSN: 2249-8958, vol. 3, Issue 3, Feb. 2014, pp. 34-37.
Milioris et al. "Indoor Positioning in Wireless LANs Using Compressive Sensing Signal-Strenth Fingerprints." 19th European Signal Processing Conference 2011, Barcelona Spain; 5 pages.
Vanhoy et al. "A Spatial Interpolation Method for Radio Frequency Maps based on the Discrete Cosine Transform." 2013 IEEE Military Communications Conference, Nov. 18-20, 2013, San Diego, CA; pp. 1045-1050.
Wirola Laura et al: "Bandwidth and storage reduction of radio maps for offline WLAN positioning", International Conference on Indoor Positioning and Indoor Navigation, IEEE, Oct. 28, 2013 (Oct. 28, 2013), pp. 1-9.
International Search Report and Written Opinion of International Search Authority for International Patent Application No. PCT/EP2015/060446 dated Feb. 11, 2016, 16 pages.
Pennebaker, W. B. et al., JPEG: Still Image Data Compression Standard, Springer Science & Business Media (1993) (entire book).
Sayood, K., Introduction to Data Compression, Morgan Kaufmann Publishing, Chapters 2, 8, and 9 (2012) pp. 13-14 and 217-294.

* cited by examiner

COMPRESSING AND DECOMPRESSING DATA ABOUT RADIO SIGNALS

FIELD OF THE DISCLOSURE

The invention relates to the field of positioning and more specifically to the compression and decompression of data about radio signals.

BACKGROUND

A network based positioning of a mobile device is based on measurements taken from available communications networks, such as cellular networks and wireless local access networks (WLAN). Depending on the signaling structures in the network, measurements used for the positioning can be Received Signal Strength (RSS), propagation delay, Angle Of Arrival (AOA), Round-Trip Time (RTT), or any other measurement that is applicable for positioning purposes.

Typically, the network based positioning is divided in two stages, a training stage and a positioning stage.

In the training stage, learning data is collected. The data may be collected in the form of fingerprints that are based on measurements of mobile devices. A fingerprint may contain a location estimate and measurements taken from the radio interfaces. The location estimate may be for example global navigation satellite system (GNSS) based, sensor-based, WLAN-based, or input manually. The measurement results may comprise signal characteristics, for example RSS values in dBm in which the Doppler effect (fast fading) has been averaged out, and/or timing characteristics (e.g. RTT). In addition, the measurement results may comprise an identification of the transmitter transmitting the detected signal. A base station, as an example transmitter, may be identified for instance by a Cell ID in cellular networks, while wireless local area network (WLAN) access points or Bluetooth low energy (BLE) transmitters, as further example transmitters, may be identified by medium access control (MAC) addresses and/or service set identifiers (SSID), etc. The training can be a continuous background process, in which mobile devices are continuously reporting measurement results to a server or learn their radio environment internally offline.

If the data is collected by a server, the collected measurement data may be uploaded to a database in the server or in the cloud, where algorithms may be run to generate models of radio communication nodes for positioning purposes. Such models may be coverage areas, node positions, radio maps, radio propagation models, etc. In the end, these models or parts of them may be transferred to mobile devices for use in position determination. Alternatively, the models may be stored in a positioning server to which the mobile devices may connect to for obtaining position information.

In an estimation/positioning stage or data estimation stage, the current location of a mobile device may be estimated by comparing measurement results of the mobile device with data or a subset of data that is available from the training stage.

One considerable difference between indoor and outdoor positioning is the importance of vertical direction. In outdoor positioning it is often enough to achieve horizontal position estimates using a two-dimensional map, whereas indoors, especially in tall buildings, it may be essential to have a capability to estimate also the user floor. This leads to a three-dimensional data processing both in the data collection stage and the positioning stage.

SUMMARY OF SOME EMBODIMENTS OF THE INVENTION

For a first aspect, an example embodiment of a method comprises, performed by at least one apparatus, obtaining a set of radio data comprising signal strength related values for radio signals transmitted by a transmitter with an association of each signal strength related value with a representation of a geographical location. The method further comprises applying a frequency transform to the obtained set of radio data to obtain transform coefficients, each transform coefficient comprising a transform index and an associated transform value. The method further comprises selecting a subset of transform indices having more significant transform values than the remaining transform indices. The method further comprises compressing the transform indices by encoding each transform index exploiting a probability of occurrence of an index value of a respective transform index.

For a second aspect, an example embodiment of a method comprises, performed by at least one apparatus, obtaining encoded transform indices belonging to a set of transform coefficients, wherein the transform indices have been encoded exploiting a probability of occurrence of an index value of a respective transform index. The method further comprises decoding the encoded transform indices. The method further comprises applying an inverse frequency transform to the set of transform coefficients including the decoded transform indices and associated transform values to obtain a reconstructed set of radio data for a particular transmitter, the reconstructed set of radio data comprising signal strength related values for radio signals with an association of each signal strength related value with a representation of a geographical location. The method further comprises providing the reconstructed set of radio data for use in positioning operations.

For the first aspect, an example embodiment of a first apparatus comprises means for performing the actions of the example method presented for the first aspect.

For the second aspect, an example embodiment of a first apparatus comprises means for performing the actions of the example method presented for the second aspect.

The means of the first apparatus presented for the first aspect as well as the means of the first apparatus presented for the second aspect can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit.

For the first aspect, moreover an example embodiment of a second apparatus is presented, which comprises at least one processor and at least one memory including computer program code, the at least one memory and the computer program code configured to cause the processor at least to perform the actions of the example method presented for the first aspect.

For the second aspect, moreover an example embodiment of a second apparatus is presented, which comprises at least one processor and at least one memory including computer program code, the at least one memory and the computer program code configured to cause the processor at least to perform the actions of the example method presented for the second aspect.

Any of the described apparatuses may comprise only the indicated components or one or more additional components.

For the first aspect, moreover an example embodiment of a non-transitory computer readable storage medium is presented, in which computer program code is stored. The computer program code causes an apparatus to perform the actions of the example method presented for the first aspect when executed by a processor.

For the second aspect, moreover an example embodiment of a non-transitory computer readable storage medium is presented, in which computer program code is stored. The computer program code causes an apparatus to perform the actions of the example method presented for the second aspect when executed by a processor.

For both aspects, the computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the respective computer program code by itself has to be considered an embodiment of the invention. The computer program code could also be distributed to several computer readable storage mediums for each aspect.

In certain embodiments, any of the presented methods is an information providing method, and any of the presented first apparatuses is an information providing apparatus. In certain embodiments, the means of the presented first apparatus of the first aspect or the means of the presented first apparatus of the second aspect are processing means.

In certain embodiments of the methods presented for the first aspect and of the methods presented for the second aspect, the methods are methods supporting a compression of radio data. In certain embodiments of the apparatuses presented for the first aspect and of the apparatuses presented for the second aspect, the apparatuses are apparatuses supporting a compression of radio data. Supporting the compression of radio data may comprise compressing and/or decompressing radio data.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 6b is a diagram illustrating a DCT matrix generated from the radio image of FIG. 6a;

DETAILED DESCRIPTION OF THE FIGURES

Figure 1:
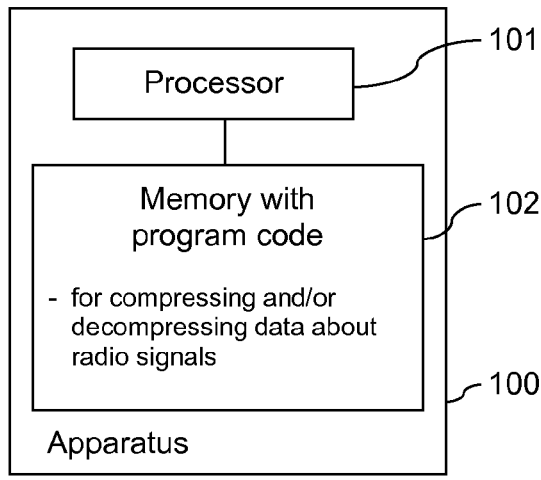
FIG. 1 is a schematic block diagram of an example embodiment of an apparatus.

FIG. 1 is a schematic block diagram of an example embodiment of an apparatus 100 of the first aspect or of the second aspect. Apparatus 100 comprises a processor 101 and, linked to processor 101, a memory 102. Memory 102 stores computer program code for compressing radio data and/or computer program code for decompressing radio data. Processor 101 is configured to execute computer program code stored in memory 102 in order to cause an apparatus to perform desired actions.

For both aspects, apparatus 100 could be a stationary device, like a dedicated location server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the first aspect. Processor 101 and program code for the first aspect stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus obtains a set of radio data comprising signal strength related values for radio signals transmitted by a transmitter with an association of each signal strength related value with a representation of a geographical location. (action 201) Signal strength related values for radio signals transmitted by a transmitter may be for instance signal strength related value for radio signals that have actually been measured, or values that have been derived from measured signal strength related values A derived value may be for instance an average of two or more signal strength related values that have been measured at similar locations.

The apparatus furthermore applies a frequency transform to the obtained set of radio data to obtain transform coefficients, each transform coefficient comprising a transform index and an associated transform value. (action 202) The transform value may be in the form of a real valued number and the transform index may be in the form of an N-dimensional integer, where N is the number of dimensions in the transform.

The apparatus furthermore selects a subset of transform indices having more significant transform values than the remaining transform indices. (action 203)

The apparatus furthermore compresses the transform indices by encoding each transform index exploiting a probability of occurrence of an index value of a respective transform index. (action 204) For example, the encoding may be based on a code that has been generated taking account of a respective probability of occurrence of different values of transform indices. It may be noted that the term transform index is used to refer to any particular index that is obtained for a set of radio data for particular transmitter, while transform indices obtained for sets of radio data for various transmitters may have the same index value. The term index value may thus refer, for example, to the specific composition of an N-dimensional integer forming a transform index.

An alternative operation of apparatus 100 will now be described with reference to the flow chart of FIG. 3. The operation is an example embodiment of a method according to the second aspect. Processor 101 and the program code for the second aspect stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus obtains encoded transform indices belonging to a set of transform coefficients, wherein the transform indices have been encoded exploiting a probability of occurrence of a value of a respective transform index. (action 211)

The apparatus furthermore decodes the encoded transform indices. (action 212) For example, the decoding may be based on a code that has been generated taking account of a respective probability of occurrence of different values of transform indices.

The apparatus furthermore applies an inverse frequency transform to the set of transform coefficients including the decoded transform indices and associated transform values to obtain a reconstructed set of radio data for a particular transmitter, the reconstructed set of radio data comprising signal strength related values for radio signals with an association of each signal strength related value with a representation of a geographical location. (action 213) The signal strength related values for radio signals may be values of radio signals of a particular transmitter that may be expected to be observed at the associated represented geographical location.

The apparatus furthermore provides the reconstructed set of radio data for use in positioning operations. (action 214)

The invention proceeds from the consideration that the positioning accuracy of a positioning that is based on characteristics of signals received at a particular location is highly dependent on the quality and the amount of data collected in a training stage. By storing each fingerprint separately it is possible to preserve all the information provided during the training stage. However, having a global coverage of fingerprints and storing all of these fingerprints would imply considerable requirements on the size of a database storing the data and render several positioning solutions unfeasible.

Fingerprint data for a particular transmitter allows forming a radio image for this transmitter. A radio image may indicate for example for various locations in the coverage area of the transmitter an expected signal strength related value of signals transmitted by the transmitter. It is to be understood that the radio image may provide expected signal strength related value only for selected locations, for instance locations arranged in the form of grid points of a virtual grid arranged on the coverage area of the transmitter. Signal strength related value received in fingerprints may be mapped to such locations when forming the radio image based on the respectively indicated location of measurement. Radio images include a substantial spatial correlation. The correlation can be considered to originate from a path loss (PL) function which models the average signal strength related value at certain distance from the transmitter, and a spatially varying function which describes the shadowing caused by obstacles and non-idealities in the radio path. Since the autocorrelation function and a power spectral density functions are a Fourier transform pair, a broad autocorrelation function of any radio image results in a narrowband frequency representation. Hence, the energy of a frequency transformed radio image is compacted in one corner of a frequency matrix to a subset of coefficient indices.

Certain embodiments of the invention therefore provide for the first aspect that radio image data for a particular transmitter is frequency transformed, and that only some of the transform coefficients are selected for further use. Due to the decorrelation property of the frequency transform, a reduced number of transform coefficients may suffice for representing the frequency transformed data. Thereby, a compression of the radio image data may be achieved, while radio image data that is reconstructed based on the compressed frequency transformed data may still be sufficiently true to the original radio image.

Certain embodiments of the invention provide for the first aspect in addition that at least the transform indices of the transform coefficients are encoded exploiting a probability of occurrence of the values of the transform indices, in order to achieve a further compression of data. This takes account of the fact that key indices may repeat from one transformed set of data to another and thus a statistical compression approach may be efficient.

The compressed indices may be provided for storage or transmission. The compressed data can be provided in particular as a part of assistance data for supporting a positioning of mobile devices. In certain embodiments, the apparatus may also cause storage and/or transmission of the provided data. In certain embodiments, the apparatus may also store and/or transmit the provided data. It is to be understood that additional data may be provided too. Such additional data may but does not have to be compressed.

Certain embodiments of the invention provide for the second aspect that compressed transform indices obtained in line with the first aspect are decoded again when needed and used for reconstructing radio image data for a particular transmitter so that the radio image data is available for supporting a positioning of mobile devices. The recovered radio image data may be used internally for positioning computations or be provided for transmission to or retrieval by some other apparatus.

Certain embodiments of the invention may have the effect that the required storage space for storing a set of radio data for a particular transmitter and/or a required bandwidth for transmitting a set of radio data for a particular transmitter may be reduced. This allows storing more sets of radio data without increasing the total storage space or transmitting more sets of radio data without increasing the required bandwidth. Certain embodiments of the invention may have the effect that alternatively or in addition, the compression of the transform indices may be exploited for instance for increasing the resolution of transform values without increasing the total amount of the transform coefficients. This may improve the quality of a reconstructed set of radio data.

Figure 2:
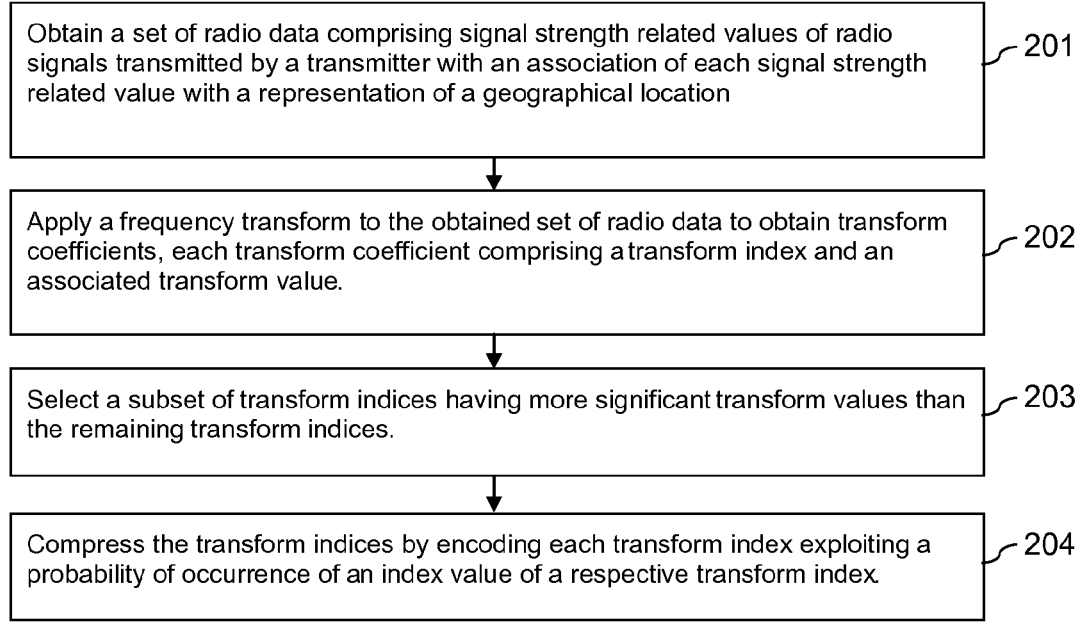
FIG. 2 is a flow chart illustrating an example embodiment of a method according to the first aspect.
Figure 3:
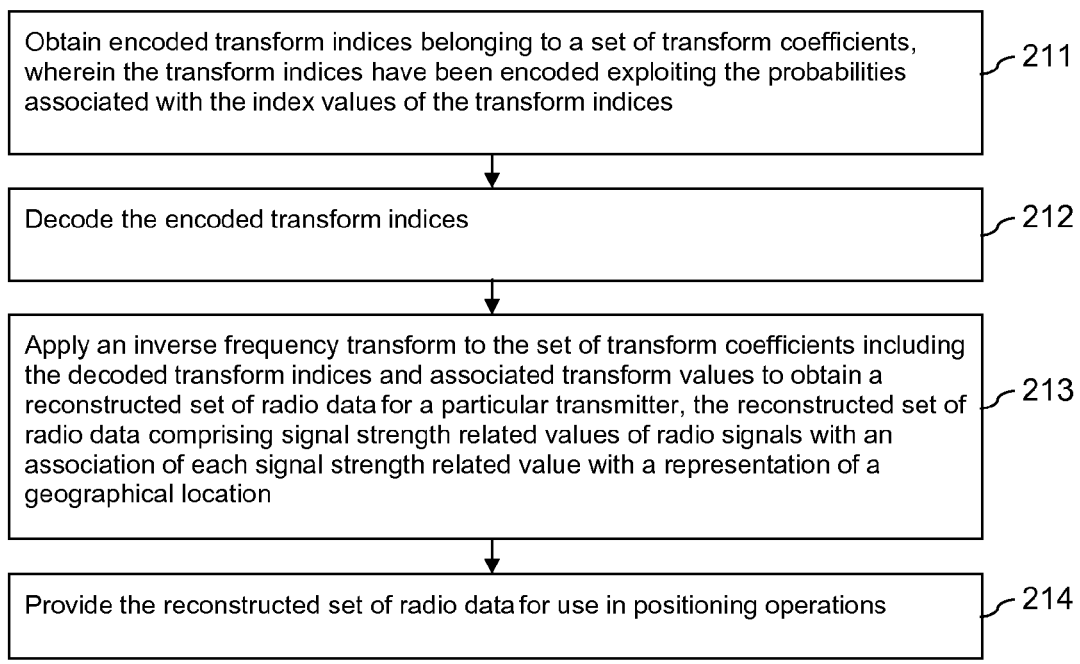
FIG. 3 is a flow chart illustrating an example embodiment of a method according to the second aspect.

Apparatus 100 illustrated in FIG. 1 and the methods illustrated in FIGS. 2 and 3 may be implemented and refined in various ways. It is to be understood that apparatus 100 could also be an example embodiment of an apparatus according to the first and second aspect of the invention.

The transform of the radio data into the frequency domain may be realized by applying any desired type of frequency transform, in particular any desired type of discrete frequency transform. In an example embodiment, applying a frequency transform to the representation of the radio data to obtain transform coefficients comprises applying a Discrete Fourier Transform (DFT) or a Discrete Cosine Transform (DCT), the latter for example, though not necessarily, in the form of a Fast Cosine Transform (FCT) in order to limit the number of required operations. Other types of frequency transforms could be used as well, like a Short-Time Fourier Transform (STFT), a Z-Transform or a wavelet transform.

The number of transform indices in the selected subset of transform indices may be fixed to a predetermined value or adaptively selected. It may be adaptively selected for instance based on an analysis of a deviation between the obtained radio data and radio data recovered from the subset of frequency components. Alternatively, it may be adaptively selected for instance to preserve a predetermined percentage of energy contained in the transform values. Using a fixed number may have the effect that the computational load for the selection is limited. Using an adaptive selection may have the effect that the number can be always as low as possible and as high as necessary for meeting certain criteria. This may also enable an efficient dealing with sets of radio data of variable size.

Certain embodiments of the first aspect comprise estimating the probability of occurrence of an index value of a transform index based on a plurality of sets of radio data, each set of radio data comprising signal strength related values for radio signals. The plurality of sets of radio data may be sets of radio data that meet at least one criterion. The probability of occurrence of an index value of a transform index may be estimated for example specifically for a particular type of transmitter based on a plurality of sets of radio data, each set of radio data comprising signal strength related values for radio signals transmitted by a different transmitter of the particular type. The probability of occurrence of an index value of a transform index may be estimated for example specifically for outdoors based on a plurality of sets of radio data, each set of radio data comprising signal strength related values for radio signals transmitted by a different transmitter and detected in at least one outdoor site. The probability of occurrence of an index value of a transform index may be estimated for example specifically for indoor locations based on a plurality of sets of radio data, each set of radio data comprising signal strength related values for radio signals transmitted by a different transmitter and detected in at least one indoor site. The probability of occurrence of an index value of a transform index may be estimated for example specifically for a particular building based on a plurality of sets of radio data, each set of radio data comprising signal strength related values for radio signals transmitted by a different transmitter and detected in the particular building. When using only sets of radio data that meet at least one criterion, this may have the effect that the processed sets of radio data may be more similar to each other, which may improve the compression of transform indices. It is to be understood, however, that it would also be possible to use any combination of sets of radio data; that is, the probability of occurrence of an index value of a transform index may be estimated for example based on a plurality of sets of radio data, each set of radio data comprising signal strength related values for radio signals transmitted by a different transmitter, without differentiation between different types of transmitters or different environments.

The encoding of transform indices may be based for instance on an available coding information, for example in the form of at least one code table. This may have the effect that the encoding may require a limited amount of computations. Such an approach may be used for example for supplementing previously encoded sets of radio data, based on which the available code has been determined. Otherwise the coding information may be computed at first based on available sets of radio data taking account of the probabilities of occurrence of index values.

Certain embodiments therefore further comprise estimating the probabilities of occurrence of index values of transform indices. The probabilities of occurrence of index values may be estimated for example by determining a subset of transform indices for several obtained sets of radio data, each set of radio data comprising signal strength related values for radio signals, by counting an occurrence of each index value of the transform indices that is present in at least one of the subsets, and by estimating a probability of occurrence of a respective index value of transform indices as the counted occurrence of the respective index value divided by total number of all transform indices in all subsets. This may have the effect that the probability may be computed fairly easily.

The encoding of transform indices may be performed for instance by encoding the original transform indices directly as absolute values; alternatively, the encoding of transform indices may be performed for instance by encoding differential indices that are derived from the original transform indices.

In certain embodiments of the first aspect, the encoding of transform indices comprises an entropy encoding. This may have the effect that the encoding may be lossless. In certain embodiments of the first aspect, the encoding of transform indices comprises a Huffman encoding or a differential encoding. A differential encoding may also make use of a Huffman encoding. In certain corresponding embodiments of the second aspect, a decoding of compressed transform indices may thus comprise an entropy decoding, a Huffman decoding and/or a differential decoding.

In certain embodiments of the invention, the encoding and decoding of transform indices comprises using shorter code words for transform indices having index values with higher probability of occurrence than for transform indices having index values with lower probability of occurrence. This may have the effect that on average, as few bits as possible may be required for the encoding of absolute transform indices. It is to be understood that it is not required that there is a different word length for each probability of occurrence. It may just be ensured, for instance, that there are code words of different length and that no code word of a shorter word length is assigned to an index value with lower probability of occurrence than some other code word of a longer word length.

In certain embodiments of the invention, encoding each transform index exploiting a probability of occurrence of an index value of a respective transform index comprises using a code table that assigns different code words to different index values of transform indices based on the probability of occurrence of the respective index value of transform indices. With assigned code words, the actual encoding process may be rendered particularly efficient. Optionally, such embodiments may further comprise, in the case that the subset of transform indices comprises a transform index having an index value for which no code word is included in the code table, encoding the transform index by a predetermined exception code word followed by a fixed length bit field representing the index value of the transform index. This may have the effect that transform indices may be encoded even if no code word has been assigned to its index value.

In certain embodiments of the invention, encoding the transform indices exploiting a probability of occurrence of an index value of a respective transform index comprises a differential encoding. Such a differential encoding may comprise for example sorting the transform indices according to ordinal numbers associated with index values of transform indices, the ordinal numbers being associated with the index values of transform indices based on the probability of occurrence of each index value of transform indices. Such a differential encoding may further comprise for example determining a respective distance from one ordinal number to the next to obtain a sequence of differential indices. Such a differential encoding may further comprise for example encoding the differential indices using shorter coding words for differential indices having index values with higher probability of occurrence than for differential indices having index values with lower probability of occurrence. Using a differential encoding for the transform indices may have the effect that the total number of bits required for representing the encoded transform indices may be reduced even further.

Certain embodiments of the invention further comprise estimating probabilities of occurrence of index values of differential indices by determining a subset of transform indices for several sets of radio data, each set of radio data comprising signal strength related values for radio signals, obtaining a sequence of differential indices separately for each set of radio data, counting an occurrence of each index value of differential indices over all subsets, and estimating the probability of a respective index value of differential indices as the occurrence of the respective index value of differential indices divided by total number of differential indices determined for all subsets.

In certain embodiments, sorting the transform indices according to ordinal numbers associated with index values of transform indices comprises using an ordinal number table that assigns different ordinal numbers to different index values of transform indices based on the probability of occurrence of the index values of transform indices. Such an ordinal number table may also be considered to be a code table. Optionally, such an embodiment may further comprise, in the case that the subset of transform indices comprises a transform index having an index value for which no ordinal number is included in the ordinal number table, encoding the transform index by a predetermined exception code word followed by a fixed length bit field representing the index value of the transform index.

In certain embodiments, encoding the differential indices using shorter coding words for differential indices having index values with higher probability of occurrence than for differential indices having index values with lower probability of occurrence comprises using a code table that assigns different code words to different index values of differential indices based on the probability of occurrence of the index values of differential indices. Optionally, such an embodiment may further comprise, in the case that the differential indices comprise an index value for which no code word is included in the code table, encoding the differential index by a predetermined exception code word followed by a fixed length bit field representing the index value of the differential index.

An index value of a transform index or of a differential index may not be included in a code table for several reasons. One reason may be for example that the set of radio data based on which the index is obtained was not used in computing the code table. Another reason may be for example that only index values having a probability of occurrence exceeding a threshold are included in a code table, in order to limit the size of the code table.

Certain embodiments of the first aspect further comprise encoding transform values of the transform coefficients using any desired kind of entropy encoding. A corresponding embodiment of the second aspect may then comprise decoding of such encoded transform values of transform coefficients.

As may be taken from the above, in certain embodiments of the first aspect the encoding of transform indices may be based on general coding information or based on special coding information that was generated for specific conditions, for instance different code tables (or code books) generated for different buildings or different code tables generated for outdoors and indoors, etc. In case special coding information is employed for the encoding, the encoded transform indices for a particular transmitter may be stored in a memory along with a reference to the used code table or code tables. The code tables as such may be stored separately in the same or another memory.

Accordingly, in certain embodiments of the second aspect the decoding of the encoded transform indices is based on at least one of a plurality of stored code tables. A reference to the at least one of the plurality of stored code tables may be obtained in addition to the encoded transform indices. The at least one of the plurality of stored code tables may then be retrieved based on the obtained reference. This may have the effect that the correct code table or tables may be used for decoding. Alternatively, the at least one of the plurality of stored code tables may be obtained in addition to the encoded transform indices. This may have the effect that the apparatus obtaining the transform indices for decoding may obtain all required information without having to have access to all of the plurality of stored code tables.

Figure 4:
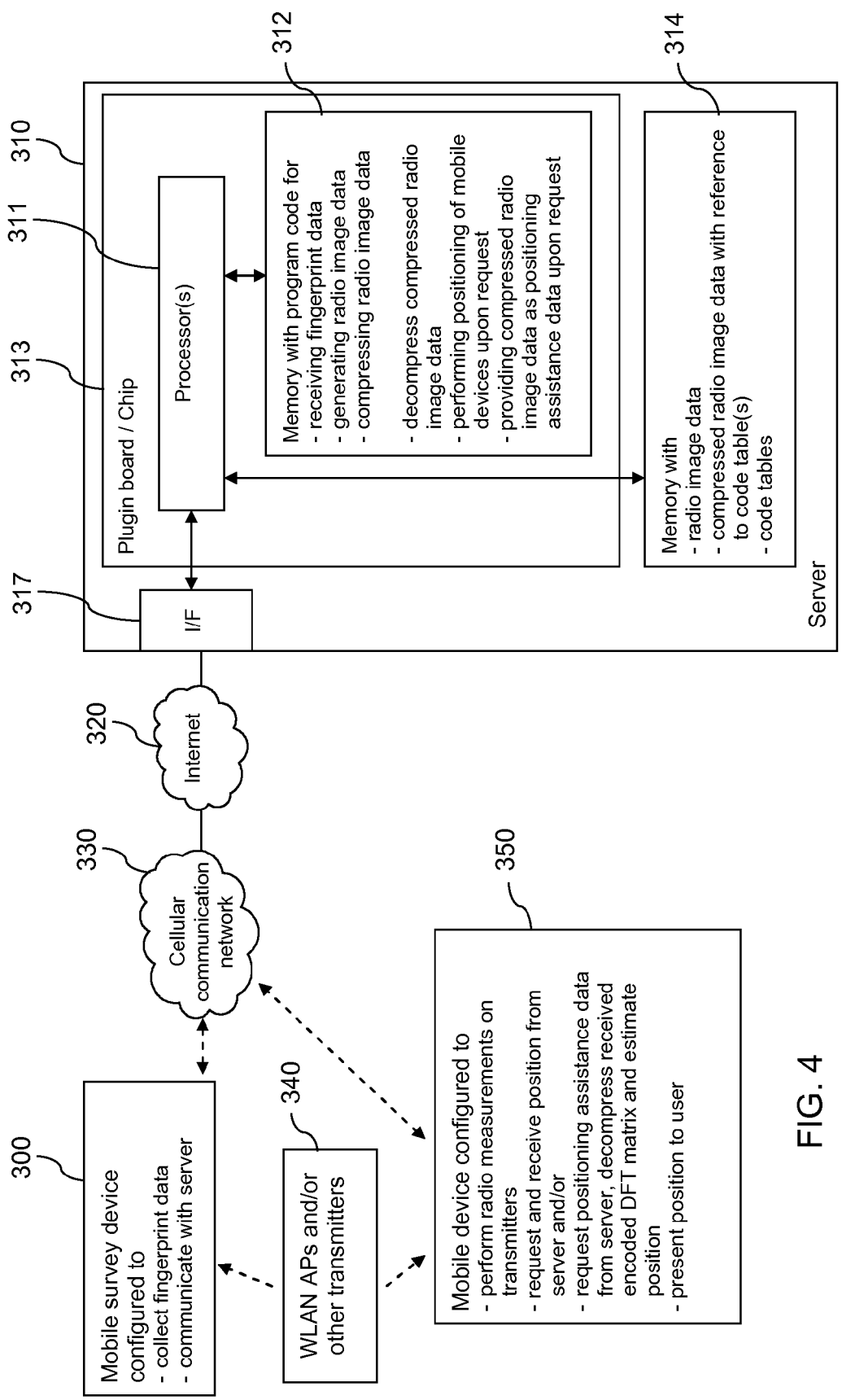
FIG. 4 is a schematic block diagram of a first example embodiment of a system.

FIG. 4 is a schematic block diagram of an example embodiment of a system supporting the compression of radio data according to both aspects of the invention.

The system comprises a mobile survey device 300, a server 310 and a mobile device 350 that may require positioning assistance. The system further comprises a network 320, by way of example the Internet. The system further comprises a cellular communication network 330 that is connected to the Internet 320. The system further comprises a number of WLAN access points (AP) 340.

Mobile survey device 300 may be for instance a regular mobile terminal, like a smartphone or general purpose tablet PC, or a dedicated survey device. Mobile survey device 300 is configured to collect fingerprints for at least one type of transmitters and to communicate with server 310 for instance via cellular communication network 330.

Server 310 may be a dedicated positioning assistance server or some other kind of server.

Server 310 comprises a processor 311 that is linked to a first memory 312, to a second memory 314 and to an interface (I/F) 317.

Processor 311 is configured to execute computer program code, including computer program code stored in memory 312, in order to cause server 310 to perform desired actions.

Memory 312 stores computer program code for receiving fingerprint data from mobile survey devices, computer program code for generating radio image data based on received fingerprint data and computer program code for compressing radio image data. Some of this program code may be similar to program code for the first aspect in memory 102. Memory 312 further stores computer program code for decompressing compressed radio image data and computer program code for performing a positioning of mobile devices upon request. Some of this program code may be similar to program code according to the second aspect in memory 102. In addition, memory 312 may store computer program code configured to realize other functions, like computer program code for providing positioning assistance data to requesting mobile devices. In addition, memory 312 may also store other kind of data.

Processor 311 and memory 312 may optionally belong to a plug-in board or a chip with an integrated circuit 313, which may comprise in addition various other components, for instance a further processor or memory.

Memory 314 is configured to store data, including for example compressed radio image data and code tables. In addition, it may store other data, including for example received fingerprint data and/or uncompressed radio image data. The storage space of memory 314 may be used for a database enabling a structured storage of the data.

It is to be understood that the data of memory 314 may also be distributed to several memories, which may be partly or completely external to server 310. For example, received fingerprint data and/or uncompressed radio image data may be stored as needed internal to server 310 and compressed radio image data may be stored along with code tables in an external memory that is accessible via another server.

Interface 317 is a component which enables server 310 to communicate with other devices, like mobile devices 300 and 350, via networks 320 and 330. It may also enable server 310 to communicate with other entities, like other servers. Interface 317 may comprise for instance a TCP/IP socket.

It is to be understood that server 310 may comprise various other components.

Component 313 or server 310 may be an example embodiment of an apparatus according to the first and second aspect of the invention.

Cellular communication network 330 may be any kind of cellular communication network, like a Global System for Mobile Communications (GSM), a CDMA2000, a Universal Mobile Telecommunications System (UMTS), or a long term evolution (LTE) based communication network.

The WLAN access points (AP) 340 may be access points of one or more WLANs. The WLAN or WLANs may but do not have to be connected to the Internet 320.

Mobile device 350 may be for instance a mobile terminal, like a regular smartphone or tablet computer. It is configured to perform measurements on WLAN access points, to request server 310 to compute and provide the position of mobile device 350 based on results of the measurements, and to present information that is based on computed and received position information to a user. Alternatively or in addition, it could also be configured to request positioning assistance data from server 310 and to perform the positioning itself. In this case, it may also be an example embodiment of the second aspect of the invention.

Example operations in the system of FIG. 4 will now be described with reference to FIGS. 5 to 14.

Figure 5:
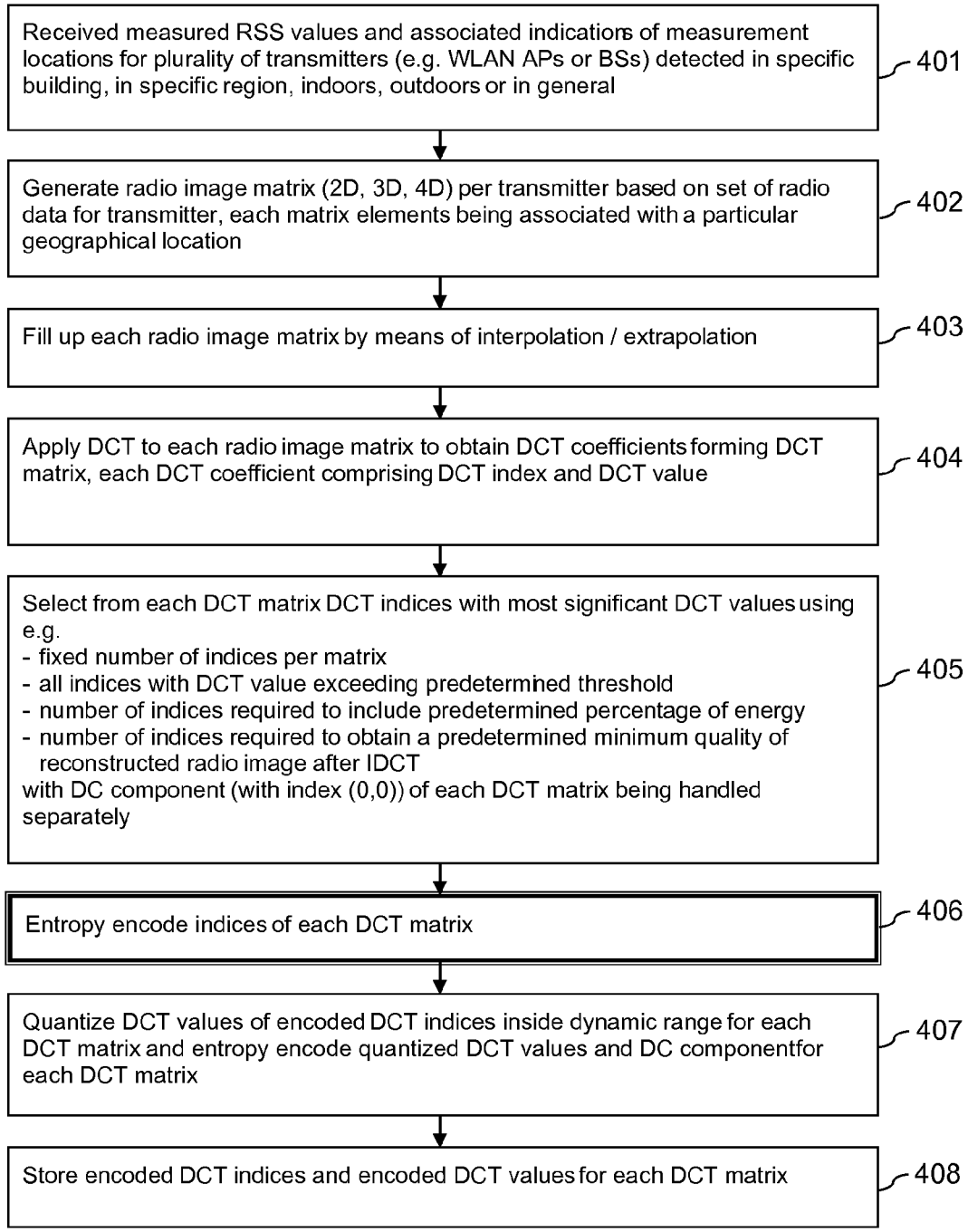
FIG. 5 is a flow chart illustrating a first example embodiment of an operation in the system of FIG. 4.

FIG. 5 is a flow chart illustrating an overview over example operations according to the first aspect. These operations may be performed for example by server 310.

Processor 311 and some of the program code stored in memory 312 may cause server 310 to perform the presented actions when the program code is retrieved from memory 312 and executed by processor 311.

Various mobile survey devices 300 perform measurements on radio signals detected at their current location, assemble the measurement results in fingerprints together with an indication of the location of measurement and provide the fingerprints to server 310. The measurement results may comprise some signal strength related value and an identity of the transmitter which transmitted the signal. The radio signals may be radio signals from one or more type of transmitters, like WLAN access points or cellular base stations. By way of example, it may be assumed that the mobile devices 300 detect specifically signals from WLAN access points 340 and that the signal strength related values included for each detected signal in a fingerprint are RSS values. The location of measurement may be input by the users of mobile survey devices 300 or determined by other means at mobile survey devices 300, like an assisted satellite signal based positioning.

Server 310 receives the fingerprints from mobile survey devices 300. (action 401)

The fingerprint data may be processed separately for certain groups of transmitters according to desired criteria. For example, fingerprint data for transmitters of different types—like WLAN access points, Bluetooth transmitters, radio frequency identification (RFID) transmitters and cellular base stations—may be processed separately. Furthermore, fingerprint data collected indoors may be processed separately from fingerprint data collected outdoors; or fingerprint data collected in different buildings or different regions may be processed separately.

Server 310 generates a matrix representing a radio image for each of a plurality of transmitters based on received fingerprints containing measurement results for the respective transmitter. (action 402)

To this end, each RSS value for a respective transmitter may be mapped to a matrix element of a matrix. Each matrix element is identified by a matrix index that is composed of column number and row number. Each matrix index represents a geographical location, e.g. coordinates of a grid point of a virtual grid covering a certain area containing the transmitter. The dimension of the matrix may correspond to the dimension of such a grid. A geographical reference may be associated with the matrix, for instance longitude and latitude values of a grid point corresponding to the first upper left matrix element. The RSS value is mapped to the matrix element that represents the geographical location that is closest to the location of measurement of the RSS value. In case several RSS values have to be mapped to the same matrix element, these RSS values may be averaged and the average value may be mapped to the matrix element. Alternatively, a median value could be selected for the mapping, etc. The matrix can be for instance a two-dimensional matrix representing a horizontal area, or it could be a three-dimensional matrix representing a horizontal area in various heights. For a building, it would also be possible, for instance, to use a plurality of two dimensional matrices, in particular one for each floor. A further dimension of a matrix could be provided for time. The size of the matrix may be predetermined or predetermined for a particular building or variable, for instance based on the spreading of locations of measurements indicated for a particular transmitter.

In order to enable a compression of the matrix data by means of a frequency transform of limited complexity, like a DCT as described further below, the matrix should be fully occupied. For some locations, no measurement results may be available, though, so that the corresponding matrix elements remain empty. Therefore, missing values are filled up computationally. (action 403)

Server 310 may create additional RSS values by linear interpolation, as far as possible based on the available RSS values. Linear interpolation may result in high quality data. The actual interpolation may be preceded by a two-dimensional Delaunay triangulation step serving for establishing a suitable basis for interpolation. Each interpolated RSS value is subsequently associated with the respective matrix element for which it has been created. Linear interpolation may not be possible if there are not sufficient matrix elements with associated RSS values nearby. This may often be the case with matrix elements located at the edges of the matrix. For the remaining matrix elements without associated RSS value, RSS values are therefore created by means of linear extrapolation. A gradient based linear extrapolation approach may be simple to implement and yet be efficient. Each extrapolated RSS value is subsequently associated with the respective matrix element for which it has been created.

It has to be noted that also in the case of a three-dimensional grid, the interpolation and extrapolation may be performed separately for each horizontal layer of grid points, since in indoor 3D scenarios, the radio data may differ significantly in vertical direction.

Figure 6A:
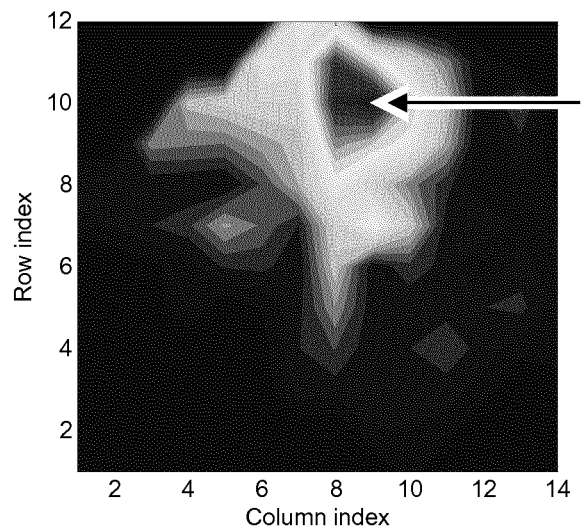
FIG. 6a is a diagram illustrating an example RSS radio image.

An example radio image for a single transmitter represented by two-dimensional matrix data is illustrated in FIG. 6a. FIG. 6a presents a two-dimensional coordinate system, which has column indices of a matrix as values of a first axis and row indices of the matrix as values of a second axis.

Different level curves indicate different levels of RSS values associated with the different combinations of columns and rows. An arrow indicates the highest RSS values, which can be expected close to the transmitter.

It is to be understood that more complex frequency transforms than a DCT may also rely on RSS values represented by a matrix in which gaps have not been filled up by interpolation or extrapolation. That is, in this case matrix elements to which no RSS values received in fingerprints are mapped may remain empty.

Server 310 may now apply a DCT to each completed radio image matrix. (action 404) A DCT may be used since all RSS values are real valued.

For an N-dimensional original radio image comprising RSS values r associated with discrete coordinate sets with the structure $(n_0, n_1, \ldots, n_{N-1})$ so that $n_i$ refers to a discrete coordinate (with $n_j = [1, N_j]$), the N-dimensional DCT $R(k_0, k_1, \ldots, k_{N-1}) = R(k)$, wherein $k = [k_0, \ldots k_{N-1}]$ is an index vector with $k_j = [1, N_j]$ which points to an element in the N-dimensional frequency transformed radio image data, may be calculated based on the following equation:

$$R(k_0, k_1, \ldots, k_{N-1}) = \omega(k_0) \ldots \omega(k_{N-1}) \sum_{n_0=1}^{N_0} \ldots$$

$$\sum_{n_{N-1}=1}^{N_{N-1}} [r(n_0, n_1, \ldots, n_{N-1}) \Phi(n_0, k_0, N_0) \ldots \Phi(n_{N-1}, k_{N-1}, N_{N-1})]$$

Therein, $$\Phi(n_i, k_i, N_i) = \cos\left[\frac{\pi(2n_i - 1)(k_i - 1)}{2N_i}\right]$$

and, with N being the size of the $j^{th}$ dimension of the radio image, $$\omega(k_j) = \begin{cases} \dfrac{1}{\sqrt{N_j}}, & \text{if } k_j = 1 \\ \sqrt{\dfrac{2}{N_j}}, & \text{otherwise} \end{cases}$$

For an example two-dimensional DCT matrix, the coefficient values $R(k_0, k_1)$ will be referred to as $a_{ij}$ in the following, with i being the row index and j the column index. The direct current (DC) coefficient $a_{11}$, and thus the RSS average of the radio image, is removed from the DCT matrix and stored separately.

Figure 6B:
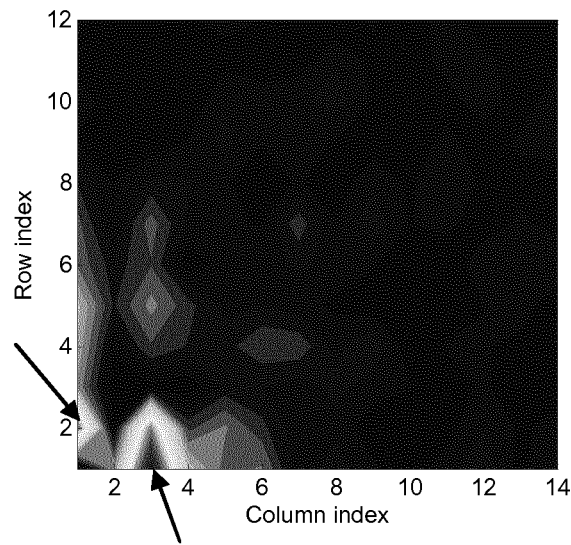

An example DCT image represented by two-dimensional matrix data is illustrated in FIG. 6b. The DCT image data is based on a DCT of the example radio image data represented in FIG. 6. FIG. 6b presents as well a two-dimensional coordinate system, which has column indices of a DCT matrix as values i of a first axis and row indices of a DCT matrix as values j of a second axis. Different level curves indicate different levels of DCT coefficient values associated with the different combinations of columns and rows. The DC component—that is, the index (1,1)—has been set to zero. The matrix has the same size as the matrix representing the original radio image. The invention exploits the observation that the energy in the DCT representation is concentrated at a few frequency domain indices in the lower left corner. Two arrows indicate the highest transform coefficient values at locations (1,3) and (2,1).

From a compression point of view, storing only a certain set of the high energy transform coefficients preserves the significant part of the total energy of the original radio image.

Figure 6C:
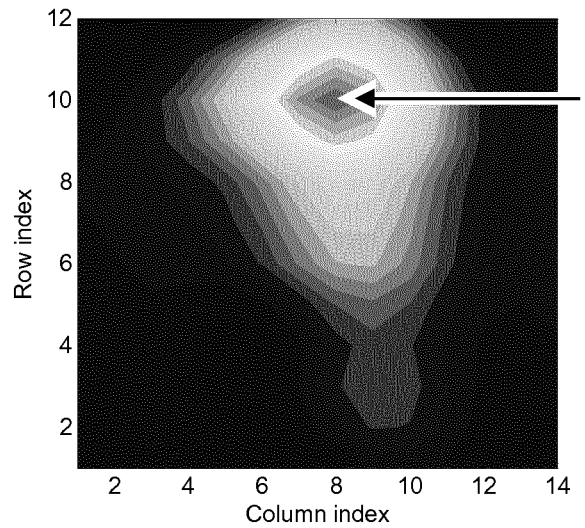
FIG. 6c is a diagram illustrating a radio image reconstructed from a limited number of coefficients of the DCT matrix of FIG. 6b.

This is illustrated in FIG. 6c, which presents a reconstructed radio image that is obtained when using the 17 largest DCT coefficient values of the DCT image of FIG. 6b as a basis for an inverse DCT. FIG. 6c presents as well a two-dimensional coordinate system, which has column indices of a radio image matrix as values of a first axis and row indices of the radio image matrix as values of a second axis. Different level curves indicate different levels of RSS values. An arrow indicates the highest RSS values, which can be expected close to the transmitter. Typically, such a reconstructed radio image is a smoother and less detailed version of the original radio image.

Thus, only a reduced number of the transform coefficients $a_{ij}$ obtained in step 404 is maintained. More specifically, for each DCT matrix that is generated, DCT indices with the most significant DCT values are selected. (action 405) The selection may be such that a fixed number of DCT indices per matrix is selected. This approach does not require any additional computations for determining the number of DCT indices that are to be selected, which may accelerate the processing and limit the processing load.

However, as the spatial correlation of the radio measurement values is not the same in every original radio image, decorrelation by means of a discrete frequency transform will not work equally well in any case, i.e. the compression quality will vary. Hence, when using a fixed number of DCT coefficients that is to be maintained, the quality of each reconstructed radio images will also vary.

Therefore, in an alternative approach, all DCT indices may be selected for which the associated DCT value exceeds a predetermined threshold. In addition, a minimum number of DCT coefficients to be maintained may be set.

In a further alternative approach, a number of DCT indices may be selected that is required to ensure that the associated DCT values include a predetermined percentage of the total energy in the DCT values. Again, in addition, a minimum number of DCT coefficients to be maintained may be set.

In a further alternative approach, a number of DCT indices may be selected that is required to ensure that a reconstructed radio image of predetermined minimum quality can be obtained with the remaining DCT coefficients. Again, in addition, a minimum number of DCT coefficients to be maintained may be set.

The DC component of the DCT matrix, that is, the DCT coefficient with index (0,0), may be excluded from the selection process and handled separately.

Already the reduction of DCT coefficients in action 405 allows reducing the number of bits that are required for representing a radio image significantly. However in some cases, particularly if the radio image is very small, the compression ratio of the image may be limited, since the number of DCT coefficients gets close to the number of original radio image matrix elements. Therefore, next the target is to compress the representation of the remaining DCT coefficients, i.e. using as low a number of bits on average as possible. This can be achieved by source coding or entropy coding. In the present example embodiment, at first the DCT indices are considered as the source data. The theoretical number of bits required to represent one DCT index on average is dependent on the entropy of the source data. The entropy of discrete source data X is based on the probability mass function p(x) of the source data as $$H(X) = -\sum_{x \in \Omega_X} p(x) \log_2(p(x)),$$

where $\Omega_X$ is the set of all possible source data values.

Thus, server 310 may now entropy encode the selected DCT indices of each DCT matrix in order to reduce the number of bits required for storing the selected DCT indices. (action 406) Different options for the entropy encoding will be presented in more detail with reference to FIGS. 7 and 11. It is to be understood that the presented options are only exemplary and that several other approaches could be used as well.

Finally, server 310 may achieve a further reduction of the number of bits that are required for representing a radio image by quantizing the DCT values that are associated with the selected and encoded DCT indices. The quantization may be performed for instance within a dynamic range for each DCT matrix. Server 310 may then entropy encode the quantized DCT values and the DC component for each DCT matrix. (action 407) Whereas the number of bits required to store the DCT indices depends on the size of the radio image, the number of bits required to store the DCT values depends on the resolution of the quantization process (i.e., the used bit depth and dynamic range). Encoding the DCT values separately from the DCT indices may require a lower computational complexity than a joint encoding.

It may be noted that with the presented approach, radio images of variable dimensions may be compressed, and the radio images may be compressed as a whole, instead of splitting the radio image up into sub-images.

The encoded DCT indices and the encoded DCT values may then be stored in memory 314 as compressed radio image data for a particular transmitter. (action 408) It is to be understood that various additional information may be stored along with this data for a particular transmitter, for example a geographical reference for the original matrix representing the radio image data for a transmitter, an indication of the size of the matrix, an indication of a point in time, e.g. the point of time at which the encoding was performed, or an indication of a time period, e.g. a time period during which fingerprints have been collected. In addition, common data may be stored, like an indication of the spacing between geographical locations that are represented by adjacent matrix elements of the original matrices representing radio image data and/or code tables that have been used for the encoding. In addition, a reference to the relevant code table(s) may be stored along with the compressed radio image data for a particular transmitter, in the case that different code tables may be used for different transmitters.

In order to ensure a high quality of a reconstructed radio image, a sufficient number of encoded DCT coefficients must be stored in memory 314. The fewer bits are used to store the DCT indices, the more DCT coefficients can be selected and stored in the database at the same cost, which automatically leads to improved quality of reconstructed radio images.

The received measured RSS values, the generated radio image matrix coefficients, the obtained DCT matrix coefficients, the selected DCT matrix indices and associated DCT values may be stored for example as well in memory 314 as long as needed for the described operations and deleted from memory 314 again when needed no longer in order to free storage space.

Figure 7:
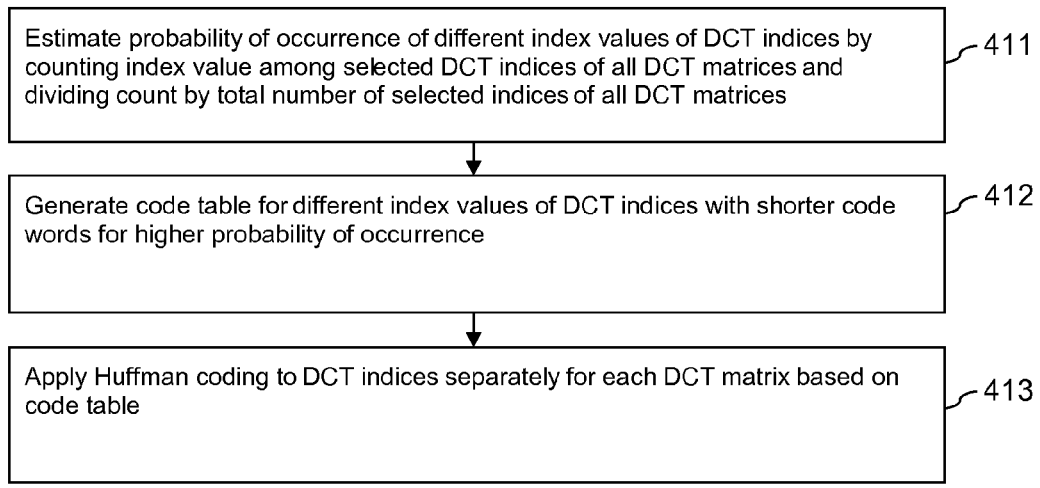
FIG. 7 is a flow chart illustrating a first example alternative for entropy encoding in the operation of FIG. 5.

FIG. 7 is a flow chart illustrating a first example approach for the entropy encoding of action 406 using a Huffman encoding.

The approach will be illustrated by means of a simplified example, in which matrices for three radio image #1, #2 and #3 have been generated for three different WLAN access points in actions 402 and 403. DCT coefficients have been generated for each of these radio images in action 404, and a variable number of DCT indices has been selected for each of these radio images in action 405. The selected DCT indices for each of the radio images are indicated in the following Table 1:

| Image #1 indices (i, j) | Image #2 indices (i, j) | Image #3 indices (i, j) |
|---|---|---|
| (1, 2) | (1, 4) | (1, 2) |
| (1, 3) | (2, 1) | (1, 3) |
| (2, 3) | (2, 3) | (1, 5) |
| (3, 3) | (3, 1) | (2, 2) |
| — | — | (2, 3) |
| — | — | (3, 2) |
| — | — | (4, 3) |

The image sizes may be allowed to differ. When using a variable DCT matrix size, the same index in two different matrices does not generally represent the same physical frequency of the DCT coefficient. However, this is not considered as a problem, and the indexing of multiple size images is maintained consistent by using the dimension-wise indices for the rows and columns as (i,j).

It is to be understood that the number of considered radio images and the number of selected DCT indices per image may be much larger in practice.

Server 310 estimates the probability of occurrence $p_{i,j}$ of different index values (i,j), for example by counting the selected transform indices with the respective same index value in all DCT matrices, and by dividing the respective number by the total number of selected transform indices of all DCT matrices in line with the following equation:

$$p_{i,j} = \frac{n_{i,j}}{\sum_{i,j} n_{i,j}},$$

where $n_{i,j}$ is the count of the index value (i,j). (action 411)

The following Table 2 shows the list of index values (i,j) for the above example for images #1, #2, #3 in a first column, the count $n_{i,j}$ for each index value in a second column and the computed probability $p_{i,j}$ for each index value in a third column:

| Index value (i, j) | Count $n_{i,j}$ | Probability $p_{i,j}$ |
|---|---|---|
| (1, 2) | 2 | 2/15 |
| (1, 3) | 2 | 2/15 |
| (1, 4) | 1 | 1/15 |
| (1, 5) | 1 | 1/15 |
| (2, 1) | 1 | 1/15 |
| (2, 2) | 1 | 1/15 |
| (2, 3) | 3 | 3/15 |
| (3, 1) | 1 | 1/15 |
| (3, 2) | 1 | 1/15 |
| (3, 3) | 1 | 1/15 |
| (4, 3) | 1 | 1/15 |

Figure 8:
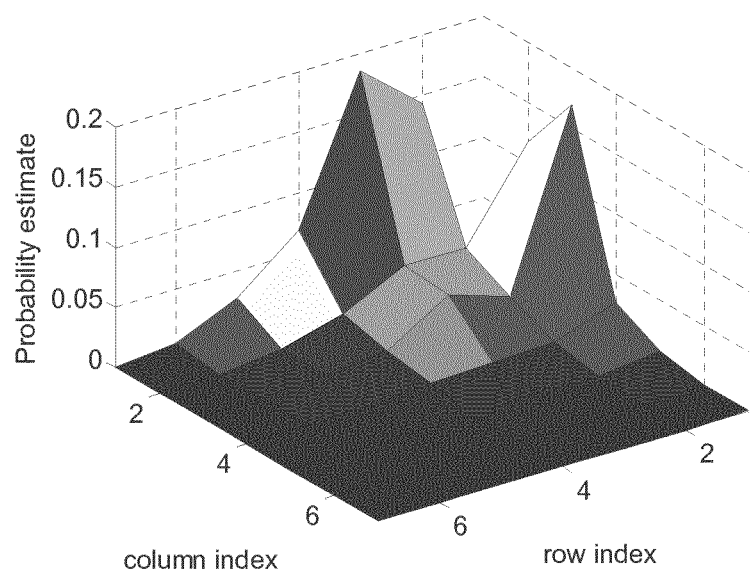
FIG. 8 is a diagram illustrating probability estimates for DCT indices.

FIG. 8 is a diagram illustrating the distribution of the probability estimates for the row and column indices for a set of real life data from a building using a three-dimensional coordinate system. A first axis represents a row index, a second axis represents a column index and a third axis represents a probability estimate. It may be noted that the highest probabilities are not necessarily determined for the index values around the lower-left corner of the matrices—that is, DCT index values (1,2), (2,1), (2,2)—since the probabilities are affected by the shape of the building and properties of the radio environment. Therefore, using the estimated probabilities from real world measurement data instead of any assumed probability distributions may enable a higher compression in variable environments.

Server 310 may now generate a code table as a basis for a Huffman coding algorithm for encoding absolute indices. (action 412) The Huffman coding makes use of variable length code words that are based on the probability distribution of the source data. The code table assigns a code word $c_{i,j}$ to any possible index value (i,j) such that DCT indices having the most probable index values may be represented with less bits than the DCT indices having less probable index values. A Huffman code includes the so called prefix property, which ensures that none of the code words can exist in the beginning of any other code word. This way, separate code words can be distinguished from each other in the decoding process, although the code word length is not constant. The generated code table is stored in memory 314.

A possible code table for the above presented example of three radio images #1, #2, #3 is presented in the following Table 3:

| Index value (i, j) | Code word $c_{i,j}$ |
|---|---|
| (1, 2) | 1 0 |
| (1, 3) | 1 0 0 |
| (1, 4) | 0 1 0 1 |
| (1, 5) | 0 1 0 0 |
| (2, 1) | 0 1 1 1 |
| (2, 2) | 0 1 1 0 |
| (2, 3) | 1 1 |
| (3, 1) | 0 0 0 1 |
| (3, 2) | 0 0 0 0 |
| (3, 3) | 0 0 1 1 |
| (4, 3) | 0 0 1 0 |

Server 310 may now use the code table for encoding the selected DCT indices separately for each DCT matrix. (action 413) For example, the DCT indices for radio image #1 {(1,2), (1,3), (2,3), (3,3)} in the considered example may be encoded using code words {$c_{1,2}$, $c_{1,3}$, $c_{2,3}$, $c_{3,3}$}, which results in a bit sequence of 1,0,1,0,0,1,1,0,0,1,1.

The Huffman code is a reasonably efficient entropy coder (the average code word length is guaranteed to be always under H(X)+1) and the generation of the code table is rather straightforward.

Figure 9:
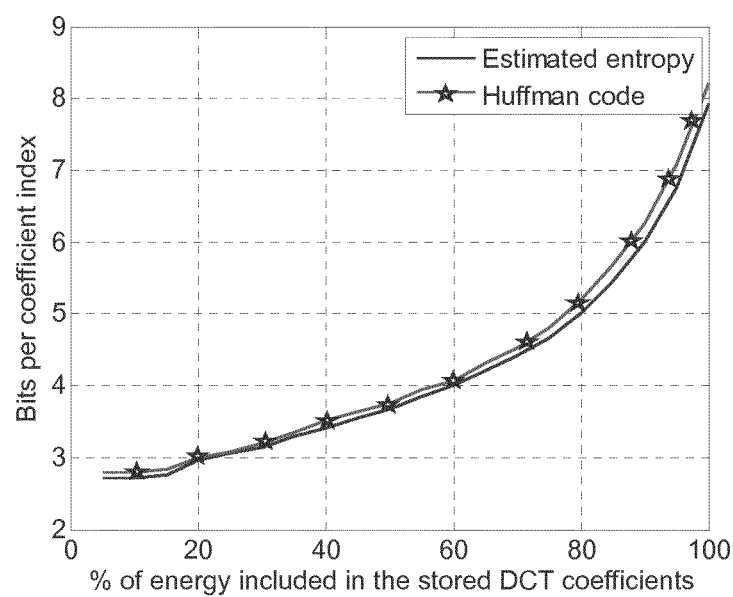
FIG. 9 is a diagram illustrating an average number of bits required for absolute DCT indices as a function of the energy included in selected DCT coefficients and an estimated entropy.

An example of Huffman coding performance for real-life data is illustrated in FIG. 9, where the average number of bits required for the encoding of each DCT index is shown. The curve is drawn as a function of the percentage of energy which is preserved from the DCT matrix when the DCT coefficients with the lowest DCT values are removed. FIG. 9 also includes the estimated entropy, which is considered to be the lower limit for any code used to encode absolute index values. It is to be noticed that here the Huffman code was generated separately for each value of the energy percentage (shown on the x-axis in the figure) in order to maintain correct source data statistics.

Figure 10:
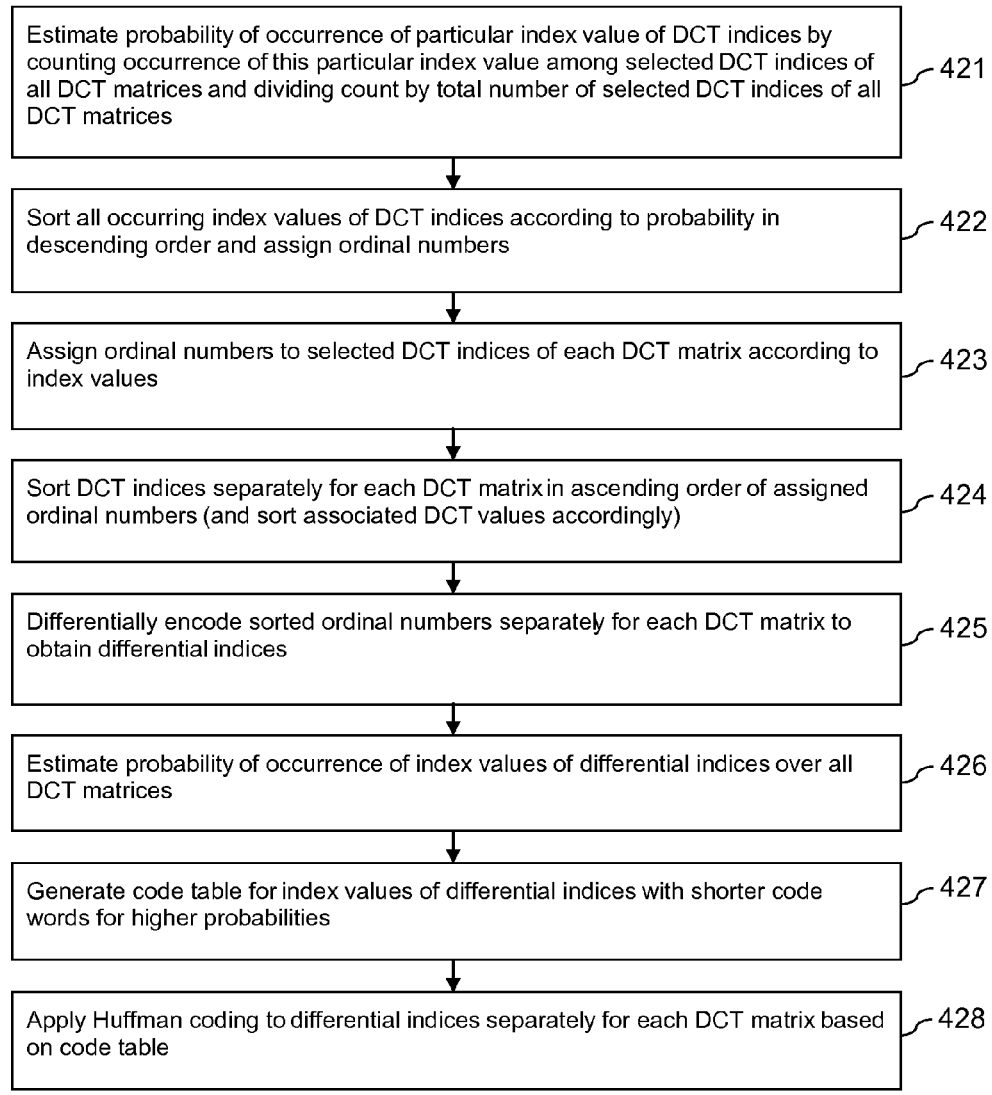
FIG. 10 is a flow chart illustrating a second example alternative for entropy encoding in the operation of FIG. 5.

FIG. 10 is a flow chart illustrating a second example approach for the entropy encoding of action 406 of FIG. 4. Compared to the approach of FIG. 7, this approach uses an encoding of differential index values instead of absolute index values.

Due to the spatial correlation in the radio image DCT indices selected in action 405 tend to concentrate near the upper-left corner of the DCT matrix (when assuming the upper left corner corresponding to index (1,1)). This phenomenon is further accelerated by the variable image size, which allows also larger frequency components to be mapped near to this corner in case that the image size is very small. This may be exploited for the compression of DCT indices by the use of differential encoding Here the idea is to sort the DCT indices based on their probabilities and to use the differences of consecutive DCT indices as the source data.

To this end, server 310 estimates as well the probability of occurrence $p_{i,j}$ of different index values (i,j) of the DCT indices. (action 421) As described with reference to action 411, this may be achieved for example by counting the selected DCT indices with the respective same index value in all DCT matrices, and by dividing the respective count by the total number of selected indices of all DCT matrices.

Server 310 now sorts all occurring index values (i,j) of the selected indices of all DCT matrices according to the determined probability $p_{i,j}$ in descending order, and assigns an ordinal number $q_{i,j}$ in ascending order to the sorted index values (i,j). (action 422) The index values having the same probability of occurrence may have any order among each other. A ordinal number table mapping the ordinal numbers to the sorted index values is stored in memory 314.

An example of a result of this operation is illustrated in the following Table 4 for the same selected example DCT indices of three radio images #1, #2, #3 presented above in Table 1:

| Index value (i, j) | Probability $p_{i,j}$ | Ordinal number $q_{i,j}$ |
|---|---|---|
| (2, 3) | 3/15 | 1 |
| (1, 2) | 2/15 | 2 |
| (1, 3) | 2/15 | 3 |
| (2, 1) | 1/15 | 4 |
| (2, 2) | 1/15 | 5 |
| (3, 1) | 1/15 | 6 |
| (1, 4) | 1/15 | 7 |
| (3, 2) | 1/15 | 8 |
| (1, 5) | 1/15 | 9 |
| (3, 3) | 1/15 | 10 |
| (4, 3) | 1/15 | 11 |

After this, server 310 assigns the determined ordinal numbers $q_{i,j}$ separately for each radio image and thus for each transmitter to the DCT indices (i,j) selected from the associated DCT matrix based on the index values of the DCT indices. (action 423) For the example radio image #1, #2, #3, this assignment is illustrated in the following Table 5:

| Image #1 (i, j) → $q_{i,j}$ | Image #2 (i, j) → $q_{i,j}$ | Image #3 (i, j) → $q_{i,j}$ |
|---|---|---|
| (1, 2) → 2 | (1, 4) → 7 | (1, 2) → 2 |
| (1, 3) → 3 | (2, 1) → 4 | (1, 3) → 3 |
| (2, 3) → 1 | (2, 3) → 1 | (1, 5) → 9 |
| (3, 3) → 10 | (3, 1) → 6 | (2, 2) → 5 |
| — | — | (2, 3) → 1 |
| — | — | (3, 2) → 8 |
| — | — | (4, 3) → 11 |

Next, server 310 sorts the DCT indices separately for each DCT matrix and thus separately for each radio image #1, #2, #3 such that the assigned ordinal numbers $q_{i,j}$ are brought into an ascending order. (action 424)

Sorting the DCT indices is not harmful, since it does not matter in which order the DCT indices are saved in a database. When the order of the DCT indices is changed, however, the order should be taken into account when the DCT values are encoded so that the sorted DCT indices can be matched with the correct DCT values. Therefore, the order of DCT values may be changed in the scope of this action as well for encoding in action 407 of FIG. 5. For example, considering radio image #1, the originally selected DCT indices were given as (1,2), (1,3), (2,3) and (3,3). For each DCT index there is a DCT value given as $a_1$, $a_2$, $a_3$, and $a_4$, respectively. Now, based on probabilities of the index values of the DCT indices, the order of the DCT indices is sorted to be (2,3), (1,2), (1,3) and (3,3), which means that the corresponding coefficient values should be in the order $a_3$, $a_1$, $a_2$, and $a_4$.

The ordinal numbers $q_{i,j}$ for each radio image #1, #2, #3 of the presented example after the sorting procedure are indicated in the following Table 6:

| Coefficient index k | Image #1 $q_{i,j}(k)$ | Image #2 $q_{i,j}(k)$ | Image #3 $q_{i,j}(k)$ |
|---|---|---|---|
| 1 | 1 | 1 | 1 |
| 2 | 2 | 4 | 2 |
| 3 | 3 | 6 | 3 |
| 4 | 10 | 7 | 5 |
| 5 | — | — | 8 |
| 6 | — | — | 9 |
| 7 | — | — | 11 |

In addition to the ordinal numbers for each radio image, general coefficient indices k are presented in a first column, such that $q_{i,j}(k)$ is the $k^{th}$ sorted coefficient ordinal number of a respective image.

Now, values of $q_{i,j}(k)$ may be efficiently differentially encoded with respect to k separately for each DCT matrix and thus for each radio image #1, #2, #3. (action 425) Defining the starting point as zero, a first differential index is always equal to the first assigned ordinal number $q_{i,j}(1)$ itself, and subsequent differential indices are defined based on the difference of the ordinal number $q_{i,j}(k)$ to the respective preceding ordinal number $q_{i,j}(k-1)$. This may be defined as follows:

$$d_k = \begin{cases} q_{i,j}(k), & \text{when } k = 1 \\ q_{i,j}(k) - q_{i,j}(k-1), & \text{when } k > 1 \end{cases}$$

Here, $d_k$ is a differential index representing the source data in the encoding process.

For the three example radio images #1, #2, #3, the differential indices $d_k$ can thus be presented as indicated in the following Table 7:

| Image #1 $d_k$ | Image #2 $d_k$ | Image #3 $d_k$ |
|---|---|---|
| 1 | 1 | 1 |
| 1 | 3 | 1 |
| 1 | 2 | 1 |
| 7 | 1 | 2 |
|   |   | 3 |
|   |   | 1 |
|   |   | 2 |

Similarly as for the absolute index values, it is now possible to estimate the probability of occurrence of the index values $d_k$ of the differential indices. (action 426)

To this end, server 310 counts the occurrence of a respective index value $d_k$ among all differential indices that have been determined for any of the radio images #1, #2, #3 and divides the count by the total number of differential indices that have been determined for any of the radio images #1, #2, #3 to obtain an estimate for a probability of occurrence for each index value $d_k$ of the differential indices.

For the considered example case, the counts $m_{i,j}$ and probability estimates $p_{i,j}$ for each occurring differential value $d_k$ are presented in the following Table 8:

| Differential index value $d_k$ | Count $m_{i,j}$ | Probability $p_{i,j}$ |
|---|---|---|
| 1 | 9 | 9/15 |
| 2 | 3 | 3/15 |
| 3 | 2 | 2/15 |
| 7 | 1 | 1/15 |

Based on the estimated probabilities, server 310 may now generate a code table as a basis for a Huffman coding algorithm encoding differential indices as source data. (action 427) The code table is equally stored in memory 314.

An example Huffman code table assigning a code word $c_k$ to each possible index value $d_k$ of the differential indices for the considered example is shown in the following Table 9:

| Differential index value $d_k$ | Code word $c_k$ |
|---|---|
| 1 | 0 |
| 2 | 1 0 |
| 3 | 1 1 0 |
| 7 | 1 1 1 |

The assignment of code words is again such that indices having the most probable index values may be represented with shorter code words and thus less bits than the indices having less probable index values.

Server 310 applies a Huffman coding to the differential indices separately for DCT matrix and thus for each transmitter based on the generated code table. (action 428) The differential indices for example radio image #1, defined as {1, 1, 1, 7} in above Table 7, may thus be encoded for instance as a bit sequence of 0, 0, 0, 1, 1, 1.

While the complexity of the differential index coding presented with reference to FIG. 10 and the related code generation method may be slightly higher than with an encoding of absolute DCT indices as presented with reference to FIG. 7, using a differential approach in encoding the DCT indices may result in a better compression ratio than an encoding of absolute DCT indices.

Both encoding alternatives presented with reference to FIGS. 7 and 10 assume that the probability of occurrence of any other index value than the ones in the respectively generated code table is zero. This may be a valid assumption, if the code table is generated based on a final set of measurement results and/or if a new code table is to be generated whenever a certain number of new measurement results are available. In practice, however, a code table can be generated as soon as enough data is available for estimating the required probabilities reliably, and it may not be expected that the code table is to be updated whenever new data becomes available. When new measurement results become available for a further transmitter, or if the radio image for a previously considered transmitter is to be updated based on new measurement results, indices may be selected in action 405 that have values for which no code words have been defined in action 412 or that result in a differential values for which no code words have been defined in action 427. To take account of such a situation, a specific exception code word can be included in the code table in action 412 or action 427, respectively. This exception code word can be used whenever an absolute or differential index has to be encoded that has a value for which no regular code word is provided in the appropriate stored code table.

Figure 11:
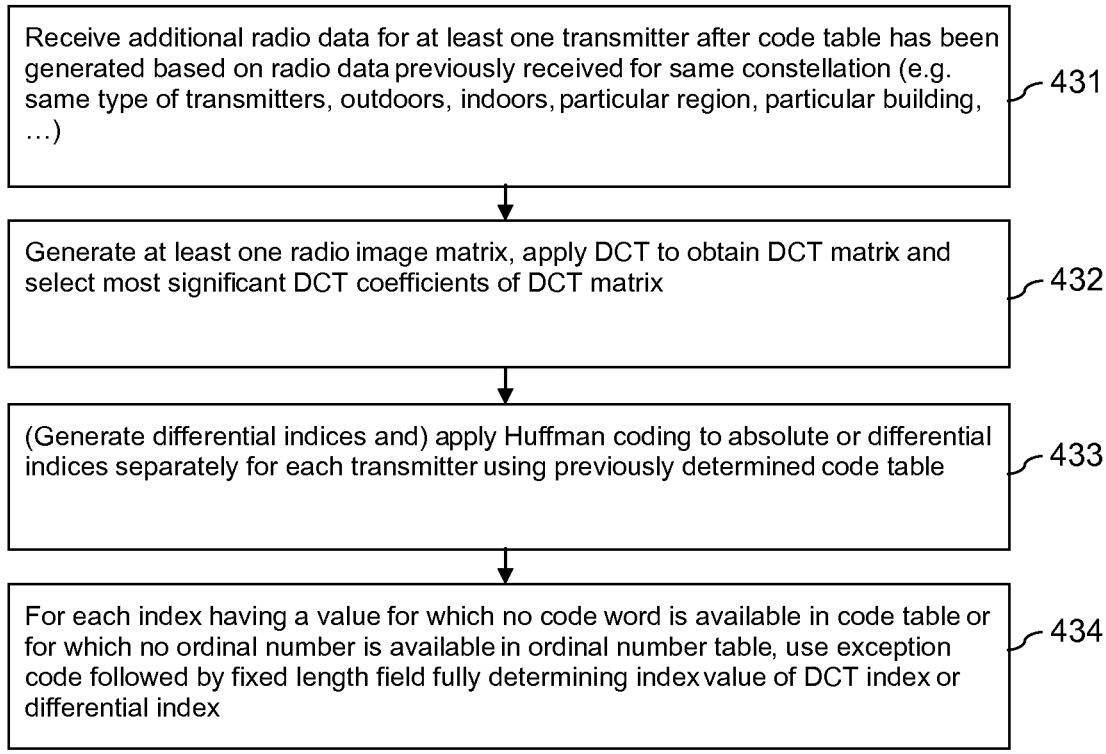
FIG. 11 is a flow chart illustrating an example encoding of radio data using an exception code.

An example approach using such an exception code word is illustrated in the flow chart of FIG. 11.

Server 310 receives from mobile survey devices radio data for at least one transmitter fitting to a particular constellation after a code table for DCT index values or for differential index values has already been generated based on a previously received radio data for the same constellation. The same constellation may be given for example if transmitters are of the same type, if all radio data has been collected outdoors, if all radio data has been collected indoors, if all radio data has been collected in a particular building, etc. If a code table was generated without constraint, it may be used for any received additional measurement results. (action 431) The code table was supplemented by an exception code word.

Server 310 then generates a radio image matrix for each transmitter for which radio data is received, applies a DCT to the radio image matrix to obtain a DCT matrix and selects the most significant DCT coefficients of the DCT matrix to obtain a subset of absolute DCT indices. (action 432) The operations may be the same as described with reference to actions 402 to 405 of FIG. 5.

Next, server 310 compresses the DCT indices by encoding them for each transmitter separately. (action 433)

In case the obtained absolute indices are to be encoded, server 310 may Huffman encode these indices directly using a code table previously generated in action 412 of FIG. 7.

In case a differential coding is to be applied, server 310 first generates differential indices based on the subset of absolute indices, as described with reference to actions 423 to 425 of FIG. 10. The differential indices may then be Huffman encoded using the code table previously generated in action 427 of FIG. 10.

For each transform index or differential index which has a value for which no code word is available in the employed code table, server 310 uses the exception code word that is defined in the employed code table, followed by a fixed length field. The code word itself does not carry any information regarding the index, but the fixed length field is used to fully determine the value of the index in question. (action 434)

Thus, the structure of the encoded bit sequence describing an index value of an absolute DCT index not appearing in the code table, for instance, may be presented as $c_{i,j}=[c_{EC}, b_i, b_j]$, where $c_{EC}$ is the exception code word, $b_i$ is a fixed length bit sequence representing the row index, and $b_j$ is a fixed length bit sequence representing the column index. Here, bi and $b_j$ may be of fixed length in order to keep synchronized with separate code words. The bit sequence lengths of $b_i$ and $b_j$ define the maximum index value that can be used in the system.

It has to be noted that the in case of a differential encoding as presented with reference to FIG. 10, it may not only be the case that the value of a differential index is missing in the code table. There may be already no ordinal number assigned to an absolute DCT index in the ordinal number table. To take account of this constellation, there may be a further exception word either in the ordinal number table or in the code table. Such an exception word could be followed by a field of fixed length, which may not only be suited to indicate the value of the DCT index, but also the original position among all DCT indices. The exception word and the fixed length field may then be added at the very end of the encoded differential indices. In decoding, the corresponding DCT index may then be inserted at the correct place based on the contained position information.

It is apparent that actions 433 and 434 are not to be understood as subsequent actions. Action 434 may rather be integrated into the operation of action 433 and used whenever needed so that the indices may be encoded subsequently.

It may be noted that the exception code word may also be used to limit the size of the required code table. For example, this may be achieved by defining a certain probability threshold for the index values included in the code table. Here, any index value below the threshold would be presented with the exception code word.

As indicted with reference to action 407 of FIG. 5, the DCT values may be compressed as well.

Figure 12:
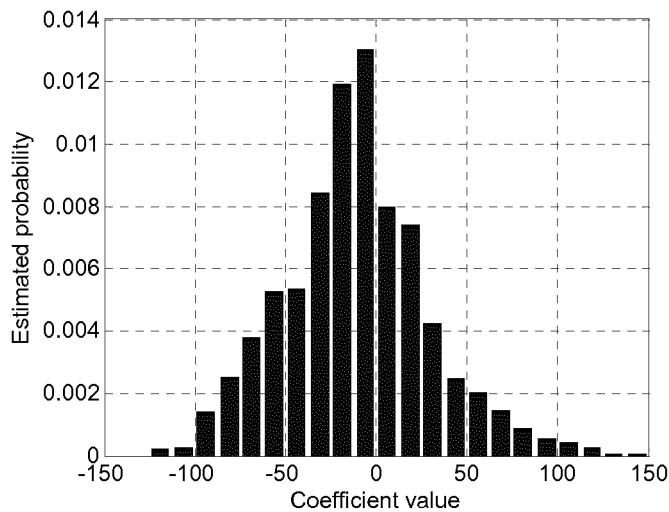
FIG. 12 is a diagram illustrating an example distribution of a probability of DCT values.
Figure 13A:
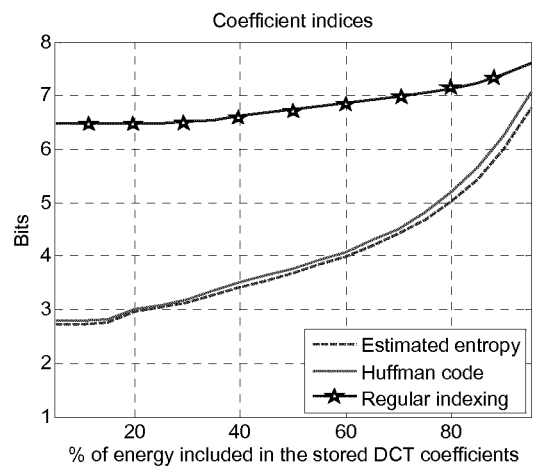
FIG. 13a is a diagram comparing an average number of required bits per DCT index when using Huffman coding and no coding.
Figure 13B:
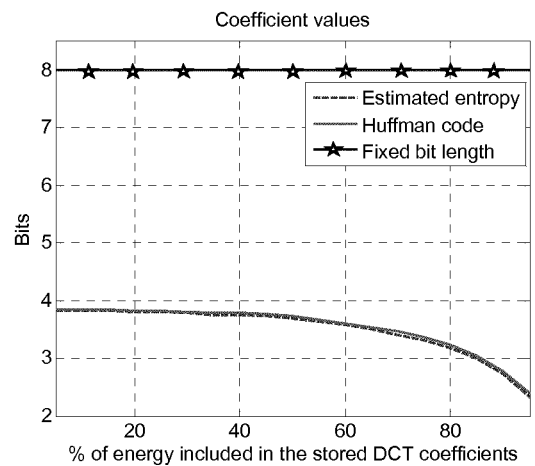
FIG. 13b is a diagram comparing an average number of required bits per DCT value when using Huffman coding and fixed bit length coding.

Similarly to the DCT indices, also the DCT values can be compressed based on their probability distribution. This is also valid for the DC component which is assumed to be stored separately. The shape of the probability distribution depends at least on the distribution of observed image sizes, the number of selected DCT coefficients, and the level of quantization. The probabilities of the DCT values can be estimated by constructing a histogram of the obtained quantized DCT values. A histogram constructed from a real life data from one building is illustrated in FIG. 12.

Although the approach of encoding the DCT values taking account of estimated value probabilities may be similar to the approach presented for the encoding of DCT indices, it has to be noted that using a differential encoding of DCT values may not be efficient, if a differential encoding is used for the DCT indices. The reason is that it is not possible to sort the DCT values according to the value magnitudes, if a sorting of DCT coefficients has already been performed in the scope of the encoding of the DCT indices. However, if the DCT indices have been encoded using the absolute encoding approach, then it is still possible to sort the amplitudes in the DCT value encoding and to use an efficient differential encoding for the DCT values.

Certain embodiments of the invention thus allow reducing the size of a database used to store DCT coefficients as compressed radio image data in a memory. This allows storing more DCT coefficients at the same cost, and thus improving the quality of reconstructed radio images, or storing DCT coefficients for more transmitters. The performance of the proposed coding using the absolute value DCT indices is illustrated for real-life data in the diagram of FIG. 13*a* for DCT indices and in the diagram of FIG. 13*b* for DCT values. For comparison, the estimated entropy and the average number of bits using regular indexing is indicated in both Figures as well. Here, the regular indexing (i.e. indexing without coding) is performed based on the number of elements in the image matrix. For example, if the image size is 3×5, 4 bits are required to represent all indices. Moreover, the DCT values are quantized with 8 bits inside the dynamic range of the DCT values. The results are shown over the different energy percentage values, which indicate which percentage of energy from the original DCT coefficients is maintained in the stored coefficients.

Figure 14:
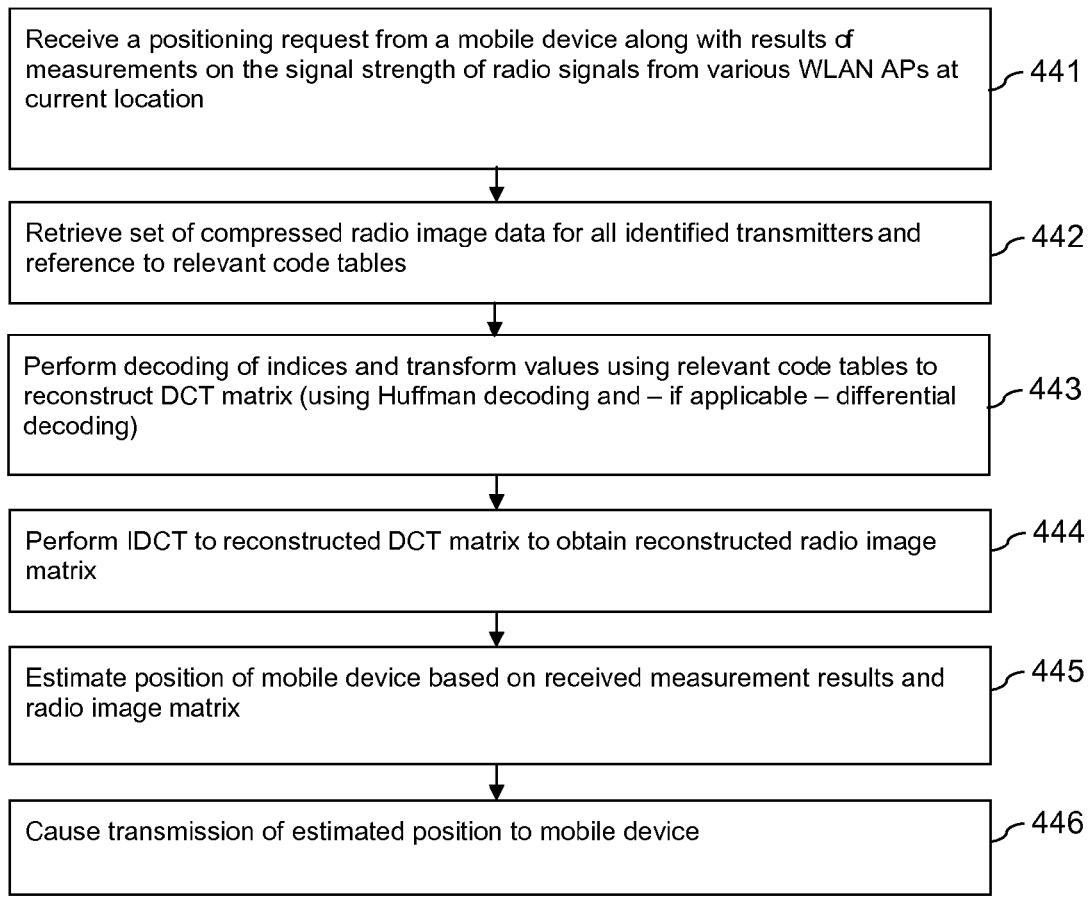
FIG. 14 is a flow chart illustrating a second example operation in the system of FIG. 4.

FIG. 14 is a flow chart illustrating example operations according to the second aspect relating to the decompression of compressed DCT coefficients.

Processor 311 and some of the program code stored in memory 312 may cause server 310 to perform the presented actions when the program code is retrieved from memory 312 and executed by processor 311.

When some application of mobile device 350 or some service accessed by mobile device 350 via a network needs to know the position of mobile device 350, mobile device 350 is caused to perform radio measurements on signals transmitted by WLAN access points or other transmitters that may be detected at the current location. The results of measurements may comprise for instance RSS values for several WLAN access points and associated identifiers of the WLAN access points. Mobile device 350 may transmit the measurement results along with a positioning request to server 310.

Server 310 receives the positioning request from mobile device 350. (action 441)

Server 310 now retrieves a set of compressed radio image data for each identified transmitter from memory 314, each set comprising encoded DCT indices and encoded DCT values for a particular transmitter. (action 442) In addition, server 310 may retrieve for each set of compressed radio image data an associated reference to a stored code table or tables from memory 314.

Sever 310 performs a decoding of DCT indices and DCT values using the relevant code tables to reconstruct a DCT matrix for each transmitter. (action 443) Corresponding to the encoding that was employed for the compression of DCT indices and DCT values, the decoding comprises only a Huffman decoding or in addition a differential decoding. The relevant code tables may be retrieved by server 310 from memory 314 based on the retrieved references to these code tables.

All elements of a reconstructed DCT matrix, for which no values are obtained in the decoding process, are set to zero.

Sever 310 applies an inverse DCT to each reconstructed DCT matrix to obtain a reconstructed radio image matrix for each transmitter. (action 444)

With $R_{recov}(k_0, k_1, \ldots, k_{N-1})$ representing a recovered N-dimensional DCT matrix, the reconstructed N-dimensional radio image matrix $r(n_0, n_1, \ldots, n_{N-1})$ may be calculated according to the following equation:

$$r(n_0, n_1, \ldots, n_{N-1}) =$$

-continued $$\sum_{k_0=1}^{N_0} \ldots \sum_{k_{N-1}=1}^{N_{N-1}} [\omega(k_0) \ldots \omega(k_{N-1}) R_{recov}(k_0, k_1, \ldots, k_{N-1})$$

$$\Phi(n_0, k_0, N_0) \ldots \Phi(n_{N-1}, k_{N-1}, N_{N-1})]$$

Therein, $$\Phi(n_i, k_i, N_i) = \cos\left[\frac{\pi(2k_i - 1)(n_i - 1)}{2N_i}\right]$$

and $$\omega(k_j) = \begin{cases} \frac{1}{\sqrt{N_j}}, & \text{if } k_j = 1 \\ \sqrt{\frac{2}{N_j}}, & \text{otherwise} \end{cases}$$

Sever 310 may now estimate the position of mobile device 350 based on the received measurement results and reconstructed radio image matrices for various transmitters. (action 445) To this end, the radio image matrices for the transmitters may be aligned to each other based on a geographical reference associated with each matrix. The estimation can be based for instance on finding the best match between RSS values in the received measurement results and RSS values in elements of the matrices corresponding to a respective same geographical location.

The estimated position is caused to be transmitted to mobile device 350. (action 446)

Mobile device 350 may use the estimated position for presenting it to a user or as a basis for some other processing by an internal or external application.

It is to be understood that alternatively, mobile device 350 may be enabled to determine its position internally and to only request positioning assistance data for indicated transmitters from server 310. Server 310 may then retrieve compressed radio image data that is stored for the indicated transmitters from memory 314, decompress the data and transmit it to mobile device 350. Alternatively, server 310 may transmit the compressed data to mobile device 350 along with the relevant code tables. For this case, mobile device 350 may be enabled to carry out a decompression of compressed data as described with reference to actions 443 and 444 of FIG. 14 and to estimate its position as described with reference to action 445 of FIG. 14. It is further to be understood that mobile device 350 could also request and receive all available compressed data for an identified area for at least one type of transmitters. This data could then be stored in mobile device 350 in compressed form to support a flexible and repeated estimation of its position as long as it is located in the identified area.

Figure 15:
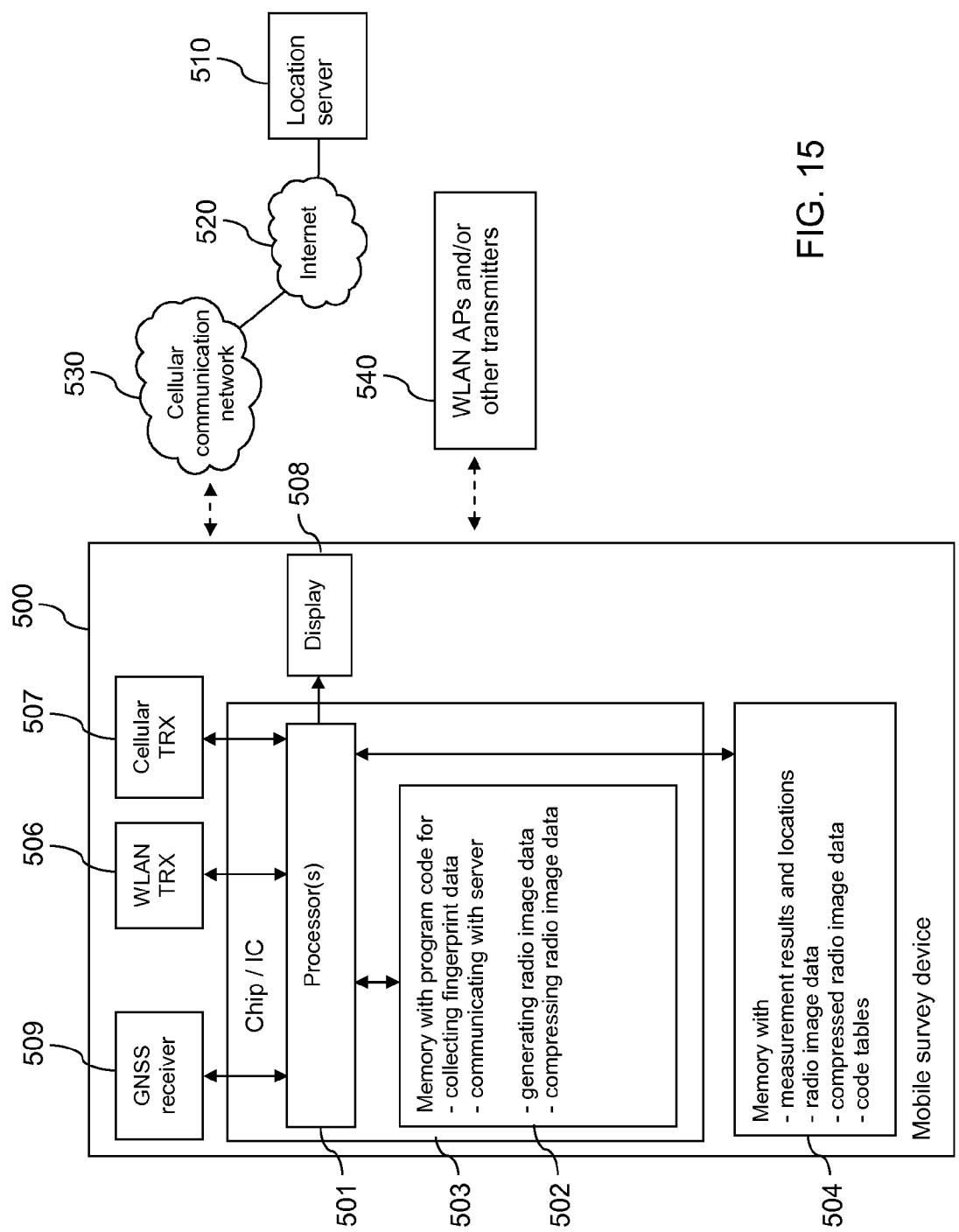
FIG. 15 is a schematic block diagram of a second example embodiment of a system.

FIG. 15 is a schematic block diagram of another example embodiment of a system supporting the compression of radio data. In this case, the compression is performed by a mobile device.

The system comprises a mobile survey device 500 and a location server 510. The system further comprises a network 520, by way of example the Internet. The system further comprises a cellular communication network 530 that is connected to the Internet 520. The system further comprises a number of WLAN access points (AP) 540.

Mobile survey device 500 may be for instance a regular mobile terminal, like a smartphone or general purpose tablet PC, or a dedicated survey device. Mobile survey device 500 comprises a processor 501 that is linked to a first memory 502, to a second memory 504, to a WLAN component 506, to a cellular communication component 507, to a display 508 and to a GNSS receiver 509.

Processor 501 is configured to execute computer program code, including computer program code stored in memory 502, in order to cause mobile survey device 500 to perform desired actions.

Memory 502 stores computer program code for assembling fingerprints, computer program code for generating radio image data, radio code for compressing radio image data and computer program code for communicating with server 510. Some of the program code in memory 502 may be similar to program code according to the first aspect in memory 102. In addition, memory 502 may store computer program code configured to realize other functions. In addition, memory 502 may also store other kind of data.

Processor 501 and memory 502 may optionally belong to a chip or an integrated circuit 503, which may comprise in addition various other components, for instance a further processor or memory.

Memory 504 is configured to store data, including for example results of measurements and locations of measurement, data of generated radio image data, compressed radio image data and code tables. It may be configured to store any other desired data as well.

WLAN component 506 includes at least a WLAN transceiver (TRX). WLAN component 506 enables mobile survey device 500 to perform radio measurements on radio signals that are broadcast by WLAN access points 540. In addition, it may enable mobile device 500 to establish a connection with WLAN access points 540 for accessing the associated WLAN. It is to be understood that any computer program code based processing required for a WLAN communication may be stored in an own memory of WLAN component 506 and executed by an own processor of WLAN component 506, or it may be stored for example in memory 502 and executed for example by processor 501.

Cellular communication component 507 includes at least a cellular transceiver. It enables mobile survey device 500 to communicate with other entities via cellular communication network 530. It may be a cellular engine that is configured to take care of all processing required for a cellular communication. Alternatively, at least some of the processing that is required for a cellular communication may be realized by processor 501 executing corresponding additional program code stored in memory 502.

Display 508 may be a touchscreen, as an exemplary user interface.

GNSS receiver 509 may comprise any kind of global navigation satellite signal receiver, for example a GPS receiver and/or a GLONASS receiver and/or a GALILEO receiver. It may be configured to receive corresponding satellite signals and to determine the current position of mobile survey device 500 based on the signals, possibly using assistance data.

It is to be understood that mobile survey device 500 may comprise various other components.

Component 503 or mobile survey device 500 may be an example embodiment of an apparatus according to the first aspect of the invention.

Location server 510 is a server that is configured to receive compressed radio image data from various mobile survey devices via the Internet 520, to generate assistance data for a WLAN based positioning based on the received compressed radio image data, and to use the assistance data for position computations upon request.

Cellular communication network 530 may be again any kind of cellular communication network. The WLAN access points (AP) 540 may be again access points of one or more WLANs.

A user of mobile survey device 500 may be responsible, for example, for comprehensively collecting fingerprints in a particular building. The collected fingerprint data may be stored in memory 504.

Once the collection has been completed, processor 510 and some of the program code stored in memory 502 may cause mobile device 500 to perform actions 402 to 407 described with reference to FIG. 5 when the program code is retrieved from memory 502 and executed by processor 501. For the entropy encoding of action 406, the example alternative presented with reference to FIG. 7 or the example alternative presented with reference to FIG. 10 could be used for example. The compressed data could then be stored in memory 504 and/or provided for transmission to server 510.

The collected fingerprint data and any other intermediate data may then be deleted again from memory 504.

In an alternative approach, mobile survey device 500 may also receive code tables and optional ordinal number tables for at least one constellation, for instance for indoors, from server 510. The code tables may be stored in memory 504. A separate code table may be provided for encoding coefficient indices and for encoding coefficient values. Each received code tables may include at least one exception code. The received code tables may be accompanied by additional information, like the type of encoding for which they are provided, i.e. absolute encoding or differential encoding, or the constellation for which they are provided. Mobile survey device 500 may then compress collected fingerprint data using the received code tables, for example as described with reference to actions 432 to 434 of FIG. 11. The compressed data may be provided again for transmission to server 510 and/or stored in memory 504.

It is to be understood that the presented example system as well as the presented example operations may be varied in many ways. The operations may be varied for instance by modifying actions, by omitting actions and/or by adding actions. In addition, the order of actions could be modified.

In an alternative embodiment, to provide just one example, a DFT, an FCT or any other desired discrete frequency transform could be used instead of the DCT.

While the presented embodiments concentrated on signals received from WLAN access points, the same approach could be used alternatively or in addition for any other kind of transmitters, like cellular transmitters, Bluetooth transmitters, RFID transmitters, etc.

In another alternative embodiment, the code tables may be updated iteratively whenever new data becomes available. This may be supported by storing the count of occurrence of index values and of the total number of indices considered so far for each code table.

Summarized, certain embodiments of the invention may have the effect that they enable an efficient code design for the DCT coefficient compression using the real-life measurement data as the basis. By this way, a unique code may be generated for different radio environments (indoor, outdoor, building-type, WLAN, cellular network etc.). Furthermore, certain embodiments of the invention may have the effect that they enable a reduction of the size of the database used to store the DCT coefficients without losing any information. This may allow storing more DCT coefficients at the same cost, which may improve the quality of reconstructed radio images. Furthermore, certain embodiments of the invention may have the effect that they allow using arbitrary large image sizes by using a specific exception code word. This may increase the stability of the system and enable a method to control the size of the code tables. Furthermore, certain embodiments of the invention may have the effect that the required number of design parameters may be very small (exception code word length and the threshold probability for using the exception code word), which may render a system analysis straightforward.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 16:
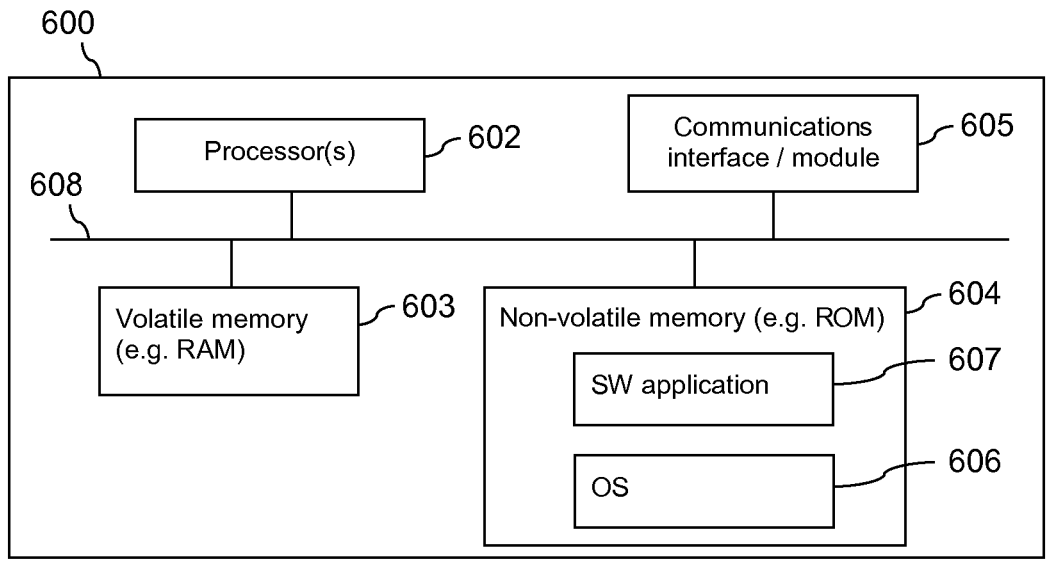
FIG. 16 is a schematic block diagram of an example embodiment of an apparatus.
Figure 17:
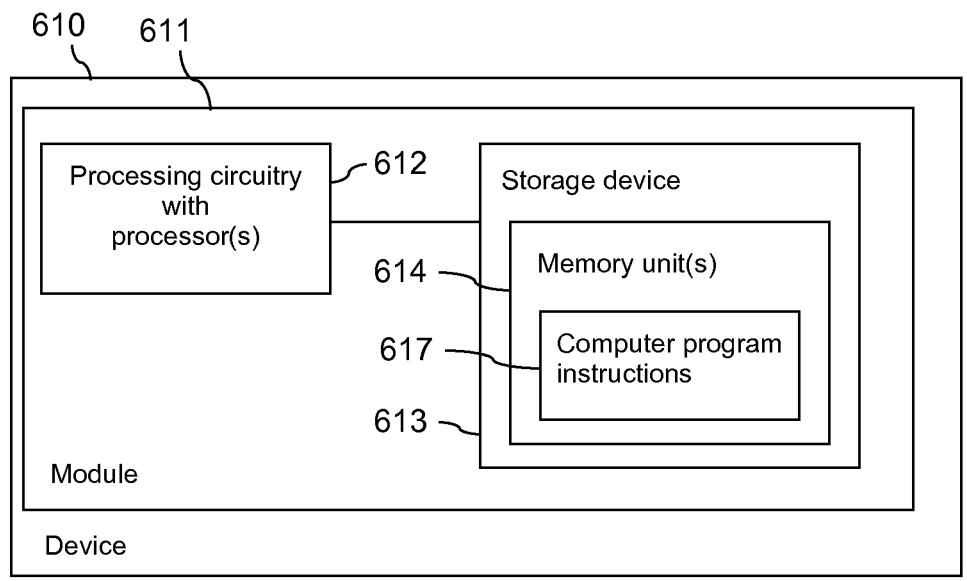
FIG. 17 is a schematic block diagram of an example embodiment of an apparatus.

Example embodiments using at least one processor and at least one memory as a non-transitory data medium are shown in FIGS. 16 and 17.

FIG. 16 is a schematic block diagram of a device 600. Device 600 includes a processor 602. Processor 602 is connected to a volatile memory 603, such as a RAM, by a bus 608. Bus 608 also connects processor 602 and RAM 603 to a non-volatile memory 604, such as a ROM. A communications interface or module 605 is coupled to bus 608, and thus also to processor 602 and memories 603, 604. Within ROM 604 is stored a software (SW) application 607. Software application 607 may be a positioning application, although it may take some other form as well. An operating system (OS) 606 also is stored in ROM 604.

FIG. 17 is a schematic block diagram of a device 610. Device 610 may take any suitable form. Generally speaking, device 610 may comprise processing circuitry 612, including one or more processors, and a storage device 613 comprising a single memory unit or a plurality of memory units 614. Storage device 613 may store computer program instructions 617 that, when loaded into processing circuitry 612, control the operation of device 610. Generally speaking, also a module 611 of device 610 may comprise processing circuitry 612, including one or more processors, and storage device 613 comprising a single memory unit or a plurality of memory units 614. Storage device 613 may store computer program instructions 617 that, when loaded into processing circuitry 612, control the operation of module 611.

The software application 607 of FIG. 16 and the computer program instructions 617 of FIG. 17, respectively, may correspond e.g. to the computer program code in any of memories 102, 312 or 502, respectively.

Figure 18:
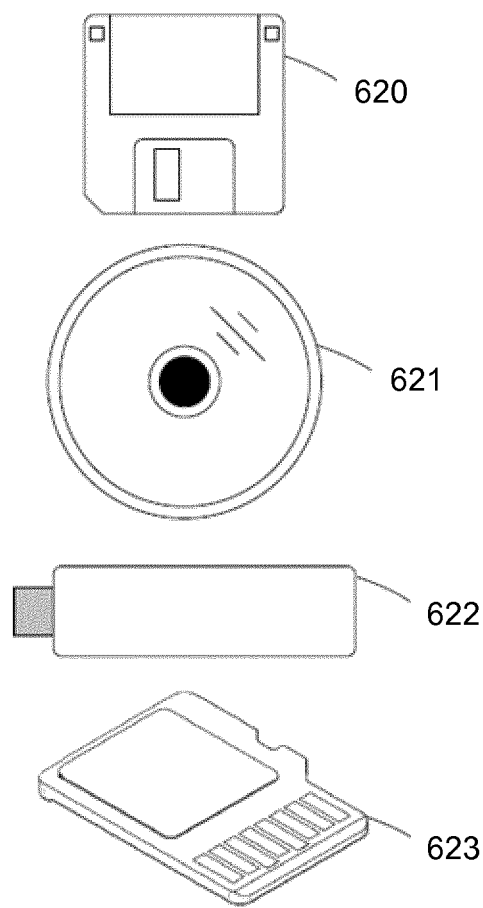
FIG. 18 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 18, which presents, from top to bottom, schematic diagrams of a magnetic disc storage 620, of an optical disc storage 621, of a semiconductor memory circuit device storage 622 and of a Micro-SD semiconductor memory card storage 623.

The functions illustrated by processor 101 in combination with memory 102, processor 311 in combination with memory 312, the integrated circuit 313, processor 501 in combination with memory 502, or the integrated circuit 503 can also be viewed as means for obtaining a set of radio data comprising signal strength related values for radio signals transmitted by a transmitter with an association of each signal strength related value with a representation of a geographical location; means for applying a frequency transform to the obtained set of radio data to obtain transform coefficients, each transform coefficient comprising a transform index and an associated transform value; means for selecting a subset of transform indices having more significant transform values than the remaining transform indices; and means for compressing the transform indices by encoding each transform index exploiting a probability of occurrence of an index value of a respective transform index.

The program codes in memories 102, 312 and 502 can also be viewed as comprising such means in the form of functional modules.

The functions illustrated by processor 101 in combination with memory 102, processor 311 in combination with memory 312, or the integrated circuit 313, can also be viewed as means for obtaining encoded transform indices belonging to a set of transform coefficients, wherein the transform indices have been encoded exploiting a probability of occurrence of an index value of a respective transform index; means for decoding the encoded transform indices; means for applying an inverse frequency transform to the set of transform coefficients including the decoded transform indices and associated transform values to obtain a reconstructed set of radio data for a particular transmitter, the reconstructed set of radio data comprising signal strength related values for radio signals with an association of each signal strength related value with a representation of a geographical location; and means for providing the reconstructed set of radio data for use in positioning operations.

The program code in memory 312 can also be viewed as comprising such means in the form of functional modules.

FIGS. 2, 3, 5, 7, 10, 11 and 14 may also be understood to represent example functional blocks of computer program codes supporting a compression of radio data.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
obtaining a set of radio data comprising signal strength related values for radio signals transmitted by a transmitter with an association of each signal strength related value with a representation of a geographical location;
applying a frequency transform to the obtained set of radio data to obtain transform coefficients, each transform coefficient comprising a transform index and an associated transform value;
selecting a subset of transform indices having more significant transform values than the remaining transform indices; and
compressing the transform indices by encoding each transform index exploiting a probability of occurrence of an index value of a respective transform index, wherein one of:
encoding each transform index exploiting a probability of occurrence of an index value of a respective transform index comprises using a code table that assigns different code words to different index values of transform indices based on the probability of occurrence of the respective index value of transform indices; or
encoding each transform index exploiting a probability of occurrence of an index value of a respective transform index comprises using a code table that assigns different code words to different index values of transform indices based on the probability of occurrence of the respective index value of transform indices, further comprising in the case that the subset of transform indices comprises a transform index having an index value for which no code word is included in the code table, encoding the transform index by a predetermined exception code word followed by a fixed length bit field representing the index value of the transform index.

2. The method according to claim 1, further comprising estimating the probability of occurrence of an index value of a transform index at least one of:
based on a plurality of sets of radio data, each set of radio data comprising signal strength related values for radio signals;

specifically for a particular type of transmitter based on a plurality of sets of radio data, each set of radio data comprising signal strength related values for radio signals transmitted by a different transmitter of the particular type;

specifically for outdoors based on a plurality of sets of radio data, each set of radio data comprising signal strength related values for radio signals transmitted by a different transmitter and detected in at least one outdoor site;

specifically for indoors based on a plurality of sets of radio data, each set of radio data comprising signal strength related values for radio signals transmitted by a different transmitter and detected in at least one indoor site;

specifically for a particular building based on a plurality of sets of radio data, each set of radio data comprising signal strength related values for radio signals transmitted by a different transmitter and detected in the particular building; and based on a plurality of sets of radio data, each set of radio data comprising signal strength related values for radio signals without differentiation between different types of transmitters or different environments.

3. The method according to claim 1, further comprising estimating the probabilities of occurrence of index values of transform indices by determining a subset of transform indices for several obtained sets of radio data, each set of radio data comprising signal strength related values for radio signals;

counting an occurrence of each index value of the transform indices that is present in at least one of the subsets; and estimating a probability of occurrence of a respective index value of transform indices as the counted occurrence of the respective index value divided by total number of all transform indices in all subsets.

4. A method comprising, performed by at least one apparatus:

obtaining a set of radio data comprising signal strength related values for radio signals transmitted by a transmitter with an association of each signal strength related value with a representation of a geographical location;

applying a frequency transform to the obtained set of radio data to obtain transform coefficients, each transform coefficient comprising a transform index and an associated transform value;

selecting a subset of transform indices having more significant transform values than the remaining transform indices; and compressing the transform indices by encoding each transform index exploiting a probability of occurrence of an index value of a respective transform index, wherein encoding the transform indices exploiting a probability of occurrence of an index value of a respective transform index comprises a differential encoding, the differential encoding comprising:

sorting the transform indices according to ordinal numbers associated with index values of transform indices, the ordinal numbers being associated with the index values of transform indices based on the probability of occurrence of each index value of transform indices;

determining a respective distance from one ordinal number to the next to obtain a sequence of differential indices; and encoding the differential indices using shorter coding words for differential indices having index values with higher probability of occurrence than for differential indices having index values with lower probability of occurrence.

5. The method according to claim 4, further comprising estimating probabilities of occurrence of index values of differential indices by:

determining a subset of transform indices for several sets of radio data, each set of radio data comprising signal strength related values for radio signals;

obtaining a sequence of differential indices separately for each set of radio data;

counting an occurrence of each index value of differential indices over all subsets;

estimating the probability of a respective index value of differential indices as the occurrence of the respective index value of differential indices divided by total number of differential indices determined for all subsets.

6. The method according to claim 4, wherein at least one of:

sorting the transform indices according to ordinal numbers associated with index values of transform indices comprises using an ordinal number table that assigns different ordinal numbers to different index values of transform indices based on the probability of occurrence of the index values of transform indices;

sorting the transform indices according to ordinal numbers associated with index values of transform indices comprises using an ordinal number table that assigns different ordinal numbers to different index values of transform indices based on the probability of occurrence of the index values of transform indices, further comprising in the case that the subset of transform indices comprises a transform index having an index value for which no ordinal number is included in the ordinal number table, encoding the transform index by a predetermined exception code word followed by a fixed length bit field representing the index value of the transform index;

encoding the differential indices using shorter coding words for differential indices having index values with higher probability of occurrence than for differential indices having index values with lower probability of occurrence comprises using a code table that assigns different code words to different index values of differential indices based on the probability of occurrence of the index values of differential indices; and encoding the differential indices using shorter coding words for differential indices having index values with higher probability of occurrence than for differential indices having index values with lower probability of occurrence comprises using a code table that assigns different code words to different index values of differential indices based on the probability of occurrence of the index values of differential indices, further comprising in the case that the differential indices comprise an index value for which no code word is included in the code table, encoding the differential index by a predetermined exception code word followed by a fixed length bit field representing the index value of the differential index.

7. An apparatus comprising at least one processor and at least one memory including computer program code, the at

33 least one memory and the computer program code configured to, with the at least one processor, cause the apparatus at least to perform:
- obtain a set of radio data comprising signal strength related values for radio signals transmitted by a transmitter with an association of each signal strength related value with a representation of a geographical location;
- apply a frequency transform to the obtained set of radio data to obtain transform coefficients, each transform coefficient comprising a transform index and an associated transform value;
- select a subset of transform indices having more significant transform values than the remaining transform indices; and
- compress the transform indices by encoding each transform index exploiting a probability of occurrence of an index value of a respective transform index, wherein one of:
  - encoding each transform index exploiting a probability of occurrence of an index value of a respective transform index comprises using a code table that assigns different code words to different index values of transform indices based on the probability of occurrence of the respective index value of transform indices; and
  - encoding each transform index exploiting a probability of occurrence of an index value of a respective transform index comprises using a code table that assigns different code words to different index values of transform indices based on the probability of occurrence of the respective index value of transform indices, the at least one memory and the computer program code further configured to, with the at least one processor, cause the apparatus to, in the case that the subset of transform indices comprises a transform index having an index value for which no code word is included in the code table, encode the transform index by a predetermined exception code word followed by a fixed length bit field representing the index value of the transform index.

8. The apparatus according to claim 7, wherein the at least one memory and the computer program code are further configured to, with the at least one processor, cause the apparatus to estimate the probability of occurrence of an index value of a transform index at least one of:
- based on a plurality of sets of radio data, each set of radio data comprising signal strength related values for radio signals;
- specifically for a particular type of transmitter based on a plurality of sets of radio data, each set of radio data comprising signal strength related values for radio signals transmitted by a different transmitter of the particular type;
- specifically for outdoors based on a plurality of sets of radio data, each set of radio data comprising signal strength related values for radio signals transmitted by a different transmitter and detected in at least one outdoor site;
- specifically for indoors based on a plurality of sets of radio data, each set of radio data comprising signal strength related values for radio signals transmitted by a different transmitter and detected in at least one indoor site;
- specifically for a particular building based on a plurality of sets of radio data, each set of radio data comprising

34 signal strength related values for radio signals transmitted by a different transmitter and detected in the particular building; and
- based on a plurality of sets of radio data, each set of radio data comprising signal strength related values for radio signals without differentiation between different types of transmitters or different environments.

9. The apparatus according to claim 7, wherein the at least one memory and the computer program code are further configured to, with the at least one processor, cause the apparatus to estimate the probabilities of occurrence of index values of transform indices by:
- determining a subset of transform indices for several obtained sets of radio data, each set of radio data comprising signal strength related values for radio signals;
- counting an occurrence of each index value of the transform indices that is present in at least one of the subsets; and
- estimating a probability of occurrence of a respective index value of transform indices as the counted occurrence of the respective index value divided by total number of all transform indices in all subsets.

10. The apparatus according to claim 7, wherein the encoding of transform indices comprises at least one of:
- an entropy encoding; and/or
- a Huffman encoding; and/or
- a differential encoding; and/or
- using shorter code words for transform indices having index values with higher probability of occurrence than for transform indices having index values with lower probability of occurrence.

11. An apparatus comprising at least one processor and at least one memory including computer program code, the at least one memory and the computer program code configured to, with the at least one processor, cause the apparatus at least to perform:
- obtain a set of radio data comprising signal strength related values for radio signals transmitted by a transmitter with an association of each signal strength related value with a representation of a geographical location;
- apply a frequency transform to the obtained set of radio data to obtain transform coefficients, each transform coefficient comprising a transform index and an associated transform value;
- select a subset of transform indices having more significant transform values than the remaining transform indices; and
- compress the transform indices by encoding each transform index exploiting a probability of occurrence of an index value of a respective transform index, wherein encoding the transform indices exploiting a probability of occurrence of an index value of a respective transform index comprises a differential encoding, the differential encoding comprising:
  - sorting the transform indices according to ordinal numbers associated with index values of transform indices, the ordinal numbers being associated with the index values of transform indices based on the probability of occurrence of each index value of transform indices;
  - determining a respective distance from one ordinal number to the next to obtain a sequence of differential indices; and
  - encoding the differential indices using shorter coding words for differential indices having index values with higher probability of occurrence than for differential indices having index values with lower probability of occurrence.

12. The apparatus according to claim 11, wherein the at least one memory and the computer program code are further configured to, with the at least one processor, cause the apparatus to estimate probabilities of occurrence of index values of differential indices by:
  determining a subset of transform indices for several sets of radio data, each set of radio data comprising signal strength related values for radio signals;
  obtaining a sequence of differential indices separately for each set of radio data;
  counting an occurrence of each index value of differential indices over all subsets;
  estimating the probability of a respective index value of differential indices as the occurrence of the respective index value of differential indices divided by total number of differential indices determined for all subsets.

13. The apparatus according to claim 11, wherein at least one of:
  sorting the transform indices according to ordinal numbers associated with index values of transform indices comprises using an ordinal number table that assigns different ordinal numbers to different index values of transform indices based on the probability of occurrence of the index values of transform indices;
  sorting the transform indices according to ordinal numbers associated with index values of transform indices comprises using an ordinal number table that assigns different ordinal numbers to different index values of transform indices based on the probability of occurrence of the index values of transform indices, the at least one memory and the computer program code further configured to, with the at least one processor, cause the apparatus to, in the case that the subset of transform indices comprises a transform index having an index value for which no ordinal number is included in the ordinal number table, encode the transform index by a predetermined exception code word followed by a fixed length bit field representing the index value of the transform index;
  encoding the differential indices using shorter coding words for differential indices having index values with higher probability of occurrence than for differential indices having index values with lower probability of occurrence comprises using a code table that assigns different code words to different index values of differential indices based on the probability of occurrence of the index values of differential indices; and
  encoding the differential indices using shorter coding words for differential indices having index values with higher probability of occurrence than for differential indices having index values with lower probability of occurrence comprises using a code table that assigns different code words to different index values of differential indices based on the probability of occurrence of the index values of differential indices, the at least one memory and the computer program code further configured to, with the at least one processor, cause the apparatus to, in the case that the differential indices comprise an index value for which no code word is included in the code table, encode the differential index by a predetermined exception code word followed by a fixed length bit field representing the index value of the differential index.

14. The apparatus according to claim 7, wherein the at least one memory and the computer program code are further configured to, with the at least one processor, cause the apparatus to:
  encode transform values of the transform coefficients using entropy encoding.

15. The apparatus according to claim 7, wherein the apparatus is one of:
  a chip;
  a module for a server;
  a server;
  a module for a mobile device; and
  a mobile device.

16. A non-transitory computer readable storage medium in which computer program code is stored, the computer program code causing an apparatus to perform the following when executed by a processor:
  obtain a set of radio data comprising signal strength related values for radio signals transmitted by a transmitter with an association of each signal strength related value with a representation of a geographical location;
  apply a frequency transform to the obtained set of radio data to obtain transform coefficients, each transform coefficient comprising a transform index and an associated transform value;
  select a subset of transform indices having more significant transform values than the remaining transform indices; and
  compress the transform indices by encoding each transform index exploiting a probability of occurrence of an index value of a respective transform index, wherein one of:
    encoding each transform index exploiting a probability of occurrence of an index value of a respective transform index comprises using a code table that assigns different code words to different index values of transform indices based on the probability of occurrence of the respective index value of transform indices; or
    encoding each transform index exploiting a probability of occurrence of an index value of a respective transform index comprises using a code table that assigns different code words to different index values of transform indices based on the probability of occurrence of the respective index value of transform indices, further comprising in the case that the subset of transform indices comprises a transform index having an index value for which no code word is included in the code table, encode the transform index by a predetermined exception code word followed by a fixed length bit field representing the index value of the transform index.

17. A non-transitory computer readable storage medium in which computer program code is stored, the computer program code causing an apparatus to perform the following when executed by a processor:
  obtain a set of radio data comprising signal strength related values for radio signals transmitted by a transmitter with an association of each signal strength related value with a representation of a geographical location;
  apply a frequency transform to the obtained set of radio data to obtain transform coefficients, each transform coefficient comprising a transform index and an associated transform value;

select a subset of transform indices having more significant transform values than the remaining transform indices; and compress the transform indices by encoding each transform index exploiting a probability of occurrence of an index value of a respective transform index, wherein encoding the transform indices exploiting a probability of occurrence of an index value of a respective transform index comprises a differential encoding, the differential encoding comprising:

sorting the transform indices according to ordinal numbers associated with index values of transform indices, the ordinal numbers being associated with the index values of transform indices based on the probability of occurrence of each index value of transform indices;

determining a respective distance from one ordinal number to the next to obtain a sequence of differential indices; and encoding the differential indices using shorter coding words for differential indices having index values with higher probability of occurrence than for differential indices having index values with lower probability of occurrence.

* * * * *